United States Patent
Salmi et al.

(10) Patent No.: US 9,544,176 B2
(45) Date of Patent: Jan. 10, 2017

(54) ASSEMBLING A PRIMITIVE HAVING INFORMATION ELEMENTS WITH A STRUCTURE RECOGNIZABLE BY A TERMINAL DEVICE AND ANOTHER ENTITY, BOTH OF WHICH COMMUNICATE OVER A NETWORK

(75) Inventors: Matti Salmi, Tampere (FI); Frank Dawson, Southlake, TX (US)

(73) Assignee: NOKIA CORPORATION, Espoo (FI)

( * ) Notice: Subject to any disclaimer, the term of this patent is extended or adjusted under 35 U.S.C. 154(b) by 577 days.

(21) Appl. No.: 13/534,810

(22) Filed: Jun. 27, 2012

(65) Prior Publication Data

US 2012/0331075 A1  Dec. 27, 2012

Related U.S. Application Data

(63) Continuation of application No. 10/099,853, filed on Mar. 13, 2002, now abandoned.

(60) Provisional application No. 60/276,273, filed on Mar. 15, 2001, provisional application No. 60/276,167, filed on Mar. 15, 2001, provisional application No.
(Continued)

(51) Int. Cl.
| | |
|---|---|
| *G06F 15/16* | (2006.01) |
| *H04L 29/06* | (2006.01) |
| *G06F 21/62* | (2013.01) |
| *H04L 12/58* | (2006.01) |
| *H04L 29/08* | (2006.01) |

(52) U.S. Cl.
CPC .......... *H04L 29/06* (2013.01); *G06F 21/6245* (2013.01); *H04L 12/581* (2013.01); *H04L 12/5815* (2013.01); *H04L 51/04* (2013.01); *H04L 51/043* (2013.01); *H04L 67/24* (2013.01); *H04L 12/5895* (2013.01); *H04L 69/329* (2013.01)

(58) Field of Classification Search
USPC .. 709/204, 227, 229; 455/466, 412; 370/335
See application file for complete search history.

(56) References Cited

U.S. PATENT DOCUMENTS

| | | | |
|---|---|---|---|
| 5,754,775 A | 5/1998 | Adamson et al. | |
| 5,828,843 A | 10/1998 | Grimm et al. | |
| (Continued) | | | |

FOREIGN PATENT DOCUMENTS

| | | |
|---|---|---|
| EP | 0 994 004 A1 | 9/1999 |
| EP | 1 021 021 A2 | 7/2000 |
| (Continued) | | |

OTHER PUBLICATIONS

"Secure Hash Standard", pp. 1-13, FIPS Pub. 180-1, Apr. 17, 1995.
(Continued)

*Primary Examiner* — Thuong Nguyen
(74) *Attorney, Agent, or Firm* — Ditthavong & Steiner, P.C.

(57) ABSTRACT

A data structure defining two-level identification allows the integration of mobile instant messaging to Internet based instant messaging, for instance, by providing an identification of both a user of the IM system (IM user) and an IM client used to access an IM system (IM client). The client may be a hardware device, software, or a combination thereof. A method, a terminal device with the client installed, a server and a system are shown for communicating such identification information between the terminal device and the server with a primitive having such two-level identification contained in information elements.

20 Claims, 28 Drawing Sheets

Related U.S. Application Data

60/276,004, filed on Mar. 15, 2001, provisional application No. 60/275,679, filed on Mar. 14, 2001.

(56) References Cited

U.S. PATENT DOCUMENTS

| | | | |
|---|---|---|---|
| 6,076,100 A * | 6/2000 | Cottrille et al. | 709/203 |
| 6,138,144 A | 10/2000 | DeSimone et al. | |
| 6,167,432 A | 12/2000 | Jiang | |
| 6,192,394 B1 * | 2/2001 | Gutfreund et al. | 709/204 |
| 6,301,609 B1 * | 10/2001 | Aravamudan et al. | 709/207 |
| 6,311,206 B1 | 10/2001 | Malkin et al. | |
| 6,484,196 B1 * | 11/2002 | Maurille | 709/206 |
| 6,539,421 B1 | 3/2003 | Appelman et al. | |
| 6,735,614 B1 * | 5/2004 | Payne et al. | 709/203 |
| 6,883,095 B2 | 4/2005 | Sandhu et al. | |
| 7,058,036 B1 * | 6/2006 | Yu et al. | 370/335 |
| 7,191,218 B1 * | 3/2007 | Innes | 709/206 |
| 2001/0013054 A1 * | 8/2001 | Okawa et al. | 709/204 |
| 2002/0006803 A1 | 1/2002 | Mendiola et al. | |
| 2002/0007398 A1 | 1/2002 | Mendiola et al. | |
| 2002/0021307 A1 | 2/2002 | Glenn et al. | |
| 2002/0165912 A1 * | 11/2002 | Wenocur et al. | 709/203 |
| 2004/0171396 A1 * | 9/2004 | Carey et al. | 455/466 |
| 2004/0199615 A1 * | 10/2004 | Philyaw | 709/220 |
| 2004/0249819 A1 * | 12/2004 | Matsumoto et al. | 707/10 |
| 2006/0184667 A1 * | 8/2006 | Clubb et al. | 709/224 |
| 2007/0203979 A1 * | 8/2007 | Walker et al. | 709/204 |
| 2010/0004001 A1 * | 1/2010 | Tao et al. | 455/456.1 |
| 2012/0030295 A1 * | 2/2012 | Bernstein et al. | 709/206 |

FOREIGN PATENT DOCUMENTS

| | | |
|---|---|---|
| EP | 1 030 244 A1 | 8/2000 |
| JP | 20002-209267 A | 7/2000 |
| JP | 2000-232446 A | 8/2000 |
| JP | 2001-249878 A | 9/2001 |
| WO | WO 98/16045 A1 | 4/1998 |
| WO | WO 00/69140 A1 | 11/2000 |
| WO | WO 99/69140 A1 | 11/2000 |

OTHER PUBLICATIONS

"Standards Group Seeks to Quell Instant Messaging Wars", IEEE Computer News Briefs, Jun. 2000, p. 23.
D. Ando et al., "Architecture of Internet Telephony Software, 'VocaLink-Soft' " pp. 997-984, NTT R & D, vol. 46, Sep. 1997, ISSN: 0915-2326.
D.H. Crocker et al., "A Common Profile for Instant Messaging (CPIM)", IETF Standard-Working-Draft, pp. 1-30, Internet Engineering Task Force, IETF, CH, Aug. 21, 2000.
E. Aoki et al., "The IMX Architecture: Interoperability with America Online's Instant Messaging Services", pp. 1-18, Jun. 15, 2000.
F. Mazzoldi et al., "Presence and Instant Message Protocol (PRIM)", pp. 1-41, IETF Standard-Working-Draft, Internet Engineering Task Force, IEFT, CH, Sep. 2000.
International Search Report for PCT/IB02/00750 dated Feb. 19, 2003, pp. 1-5.
K. Sakata et al., "Realizing Chat-Type Group Communications Based on Mailing List Systems", NEC Corporation, DICOMO 2000, pp. 1-21, Jun. 28-30, 2000, Information Processing Society of Japan (IPSJ), ISSN: 1344-0640, IPSJ Symposium Series, vol. 2000, No. 7.
M. Salmi et al., "Realization of Presence Management", U.S. Appl. No. 10/099,853 filed Mar. 13, 2002, pp. 1-123.
M. Zacks, "AOL's Instant Messaging Proposal Illicits Kudos and Brickbats", News & Trends, pp. 6-8, Jul.-Aug. 2000, IEEE Internet Computing.
M.T. Rose et al.,"The IMXP Presence Service", IETF Standard-Working-Draft, pp. 1-30, Internet Engineering Task Force, IETF, CH, No. 1, Sep. 2000.
Office Action for related Canadian Patent Application No. 2,439,380 dated Nov. 2, 2008, pp. 1-3.
Office Action for related Canadian Patent Application No. 2,439,380 dated Jan. 25, 2010, pp. 1-4.
Office Action for related Japanese Patent Application No. 2002/572524 dated Jul. 10, 2007, pp. 1-3.
Office Action for related Japanese Patent Application No. 2002-572524 dated Jun. 20, 2006, pp. 1-5.
RFC 1321, R. Rivest, "The MD5 Message—Digest Algorithm", pp. 1-16, Apr. 1992.
RFC 2069, J. Franks et al., "An extension to HTTP: Digest Access Authentication", pp. 1-13, Jan. 1997.
RFC 2778, M. Day et al., "A Model for Presence and Instant Messaging", pp. 1-13, Feb. 2000.
RFC 2779, M. Day et al., "Instant Messaging/Presence Protocol Requirements", pp. 1-23, Feb. 2000.
RFC 3174, D. Eastlake et al., "US Secure Hash Algorithm 1 (SHA1)", pp. 1-16, Sep. 2001.
Supplementary European Search Report for EP 02 70 7035 dated Dec. 22, 2005, pp. 1-6.
Office Action for related Canadian Patent Application No. 2,439,380 dated Nov. 22, 2012, pp. 1-6.
Communication from European Patent Office regarding European Application No. 02 707 035.8-1853, dated Feb. 25, 2013, pp. 1-7.
R. Fielding et al., "Hypertext Transfer Protocol—HTTP/1.1.," dated Jun. 1999, pp. 1-176, XP015008399, Issn: 0000-0003.
European Office Action for corresponding Application No. 02707035.8-1853, dated Apr. 9, 2014, 4 pages.
Office Action for corresponding European Patent Application No. 16160519.1-1853, dated Jun. 9, 2016, 10 pages.

* cited by examiner

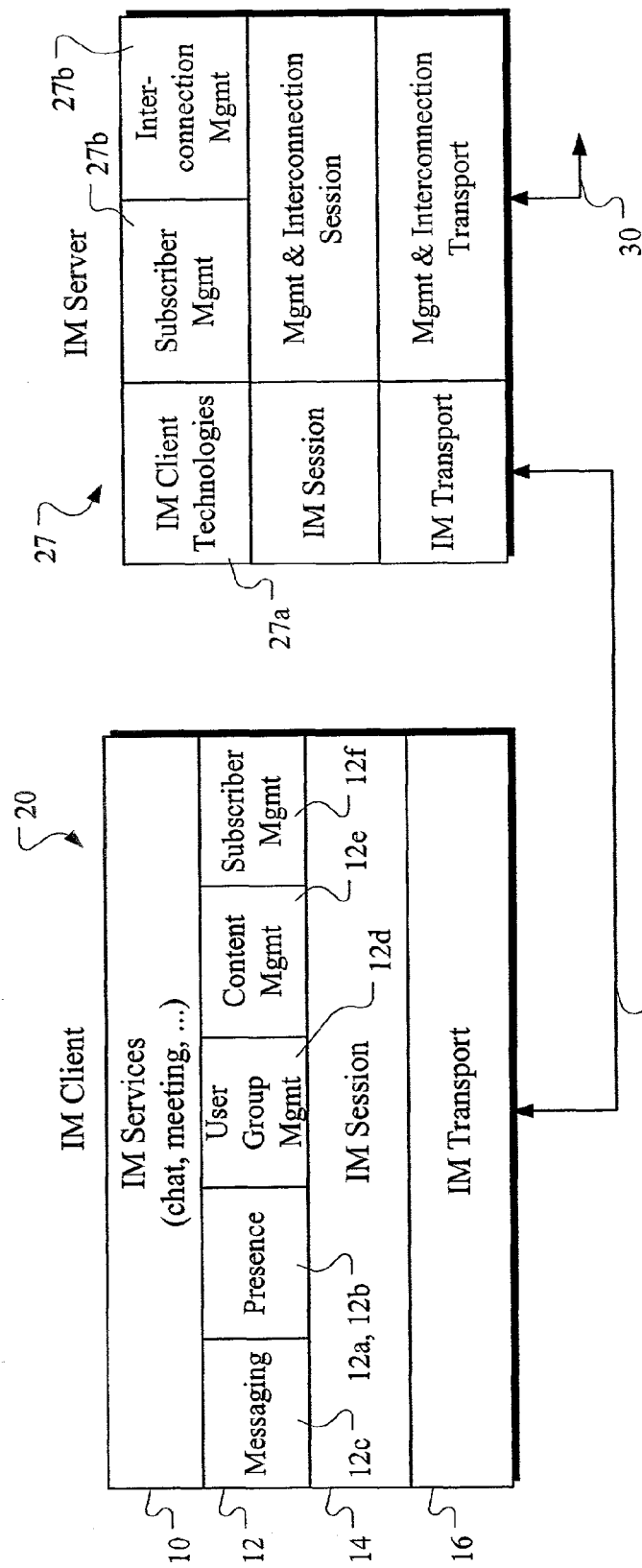
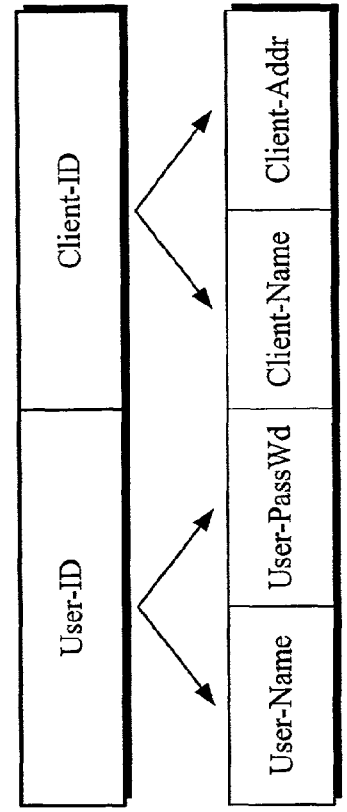
FIG. 1B
FIG. 2B

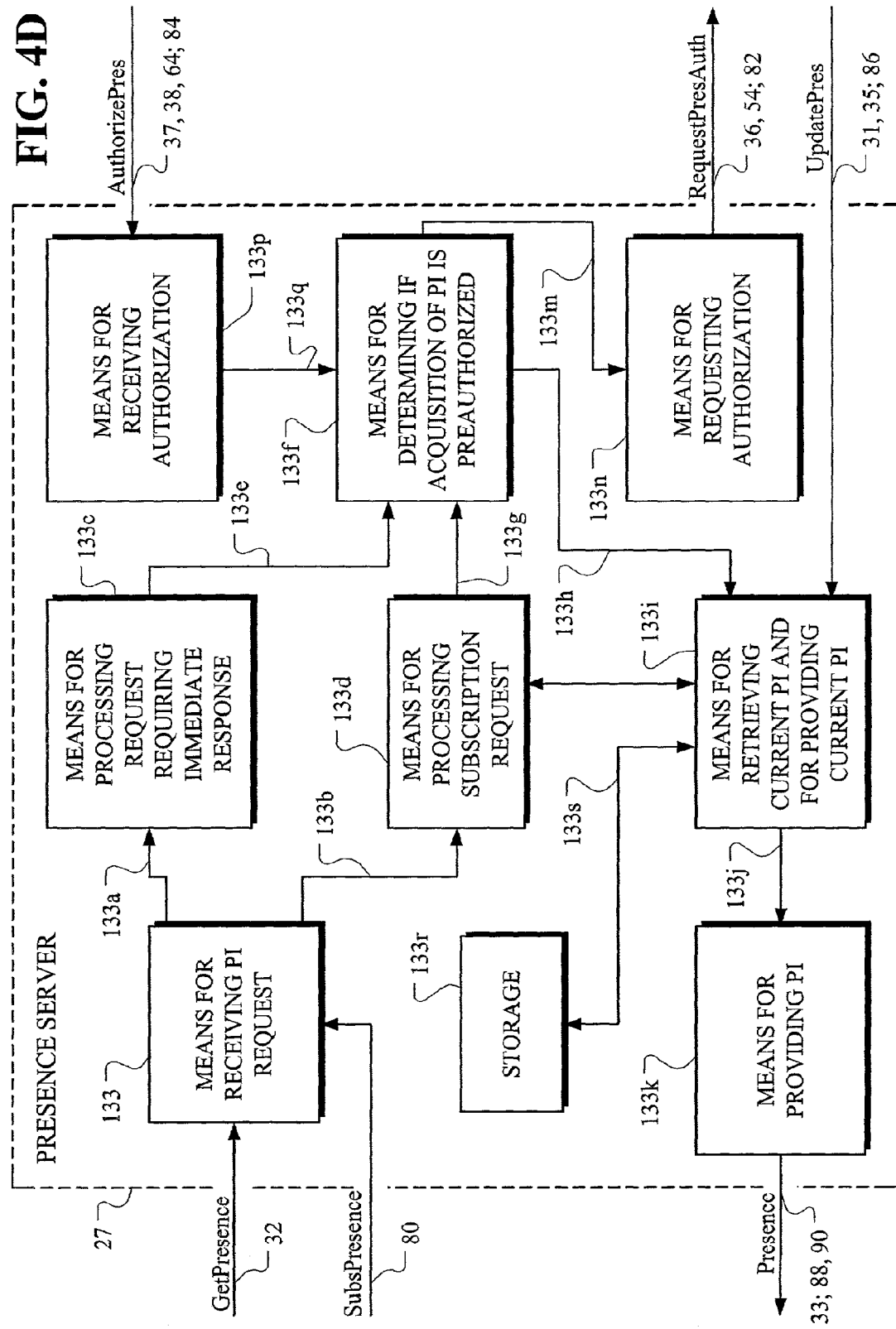

ASSEMBLING A PRIMITIVE HAVING INFORMATION ELEMENTS WITH A STRUCTURE RECOGNIZABLE BY A TERMINAL DEVICE AND ANOTHER ENTITY, BOTH OF WHICH COMMUNICATE OVER A NETWORK

CROSS-REFERENCE TO RELATED APPLICATIONS

The present application is a continuation of U.S. patent application Ser. No. 10/099,853, filed Mar. 13, 2002, which claims priority under Title 35 of the United States Code, Section 119(e), from U.S. Provisional Application Ser. No. 60/276,004 filed Mar. 15, 2001, from U.S. Provisional Application Ser. No. 60/275,679 filed Mar. 14, 2001, from U.S. Provisional Application Ser. No. 60/276,167 filed Mar. 15, 2001, and from U.S. Provisional Application Ser. No. 60/276,273 filed Mar. 15, 2001, the entireties of which are incorporated herein by reference.

TECHNICAL FIELD

The present invention relates generally to communication systems and, more particularly, to the application of instant messaging and presence services to communication systems in general.

BACKGROUND ART

An instant messaging service provides the end users a means for fast, interactive, mainly text-based communication. It includes both the Internet or SMS-style messaging with short, textual messages and also related value added services, such as presence management and chat room-type scenarios.

In general, presence can be considered containing various dynamic information of a user accessing the service via different means. Examples of this information are the reachability and availability of the user for communication and other, more emotional status such as mood and willingness for communication.

The retrieval and authorization of presence information has been solved in the Internet-based instant messaging solution in a proprietary way. The user is identified by his/her user name. Since the known and most prevalent IM system is based on access from personal desktop computers, the identification of the PC is not important; the IP-address of the PC is used only for internal routing purposes. In mobile instant messaging, the identification of the particular IM application might become more important: the user may conceivably access the service from multiple devices at the same time and some of the status information, e.g., reachability and capabilities might not best be tied to the user but rather to the particular IM application.

There is moreover a need to define a protocol using an open architecture so that various vendors can begin to offer such services.

DISCLOSURE OF INVENTION

This invention presents a method which allows the identification of both the user of IM system (IM user) and IM client used to access the IM system (IM client).

According to a first aspect of the invention, a method for communicating identification information from a terminal device to a network with a primitive having information elements with a structure recognized by said terminal device and at least one other entity able to communicate over said network, is characterized by providing the primitive with an information element identifying a client of the terminal device, and by providing the primitive identifying the client also with an information element identifying a user of the client.

Further according to the first aspect of the invention, the primitive comprises an update presence primitive for use in communicating presence information to the network.

Further still according to the first aspect of the invention, the primitive comprises an unsubscribe presence primitive for communicating a request to said network to discontinue receipt of selected presence information.

Still further according to the first aspect of the invention, the primitive comprises a leave group primitive for communicating a request to discontinue participation in a group to the network.

Further still according to the first aspect of the invention, the primitive comprises a create group primitive for communicating a request to create a group to the network.

Still further according to the first aspect of the invention, the primitive comprises a delete group primitive for communicating a request to delete a group to the network.

Further according to the first aspect of the invention, the primitive comprises a get group information primitive for communicating a request for group information to the network.

Further still according to the first aspect of the invention, the method is further characterized by the steps of providing the primitive with an information element identifying a client of another terminal device, and providing the primitive with an information element identifying a user of the client of the another terminal device.

Further according to the first aspect of the invention, the primitive comprises a get presence primitive for communicating a request for presence information to the network.

Further still according to the first aspect of the invention, the primitive comprises a subscribe presence primitive for communicating a request to subscribe to presence information to the network.

Still further according to the first aspect of the invention, the primitive comprises message primitive for communicating a message to said network.

Still further according to the first aspect of the invention, the primitive comprises an invite user primitive for communicating a request to invite a user to the network.

Still further according to the first aspect of the invention, the method is characterized by the at least one other entity comprising at least one server able to recognize the structure of said primitive, by the client first logging onto the server without providing the primitive with information elements identifying the client and the user, but identifying a supported digest schema, by receiving back an authorization failure signal from the server with a nonce serving as a challenge for the client, by the client calculating a digest concatenating the nonce, a user password and a client identification using the supported digest schema, by the client once again logging onto the server but this time with the calculated digest, by the server recalculating the digest using the supported schema and using the nonce and the client password and client identification extracted by the server from the digest provided by the client, and by the server comparing the re-calculated digest to the provided digest and accepting the login if they match.

Further still according to the first aspect of the invention, the at least one other entity using the information element identifying a client of the terminal device and the information element identifying a user of the client are used to distinguish the user and the client.

According to a second aspect of the invention, a system for communicating identification information over a network comprises at least one terminal device for providing a primitive with an information element identifying a client of the terminal device and also with an information element identifying a user of the client, and at least one other entity receiving the primitive provided over the network, and by using the information element identifying a client of the terminal device and the information element identifying a user of the client to distinguish the user and the client.

Further according to the second aspect of the invention, the primitive comprises an update presence primitive for use in communicating presence information to the network.

Further still according to the second aspect of the invention, the primitive comprises an unsubscribe presence primitive for communicating a request to the network to discontinue receipt of selected presence information.

Still further according to the second aspect of the invention, the primitive comprises a leave group primitive for communicating a request to discontinue participation in a group to the network.

Further still according to the second aspect of the invention, the primitive comprises a create group primitive for communicating a request to create a group to the network.

Still further according to the second aspect of the invention, the primitive comprises a delete group primitive for communicating a request to delete a group to the network.

Further according to the second aspect of the invention, the primitive comprises a get group information primitive for communicating a request for group information to network.

Further still according to the second aspect of the invention, the at least one terminal device provides the primitive with an information element identifying a client of another terminal device, and provides the primitive with an information element identifying a user of the client of the other terminal device.

Further according to the second aspect of the invention, the primitive comprises a get presence primitive for communicating a request for presence information to the network.

Still further according to the second aspect of the invention, the primitive comprises a subscribe presence primitive for communicating a request to subscribe to presence information to the network.

Further still according to the second aspect of the invention, the primitive comprises message primitive for communicating a message to the network.

Further still according to the second aspect of the invention, the primitive comprises an invite user primitive for communicating a request to invite a user to said network.

Still further according to the second aspect of the invention, the system is characterized by the at least one other entity comprising at least one server able to recognize said structure of the primitive, by the client first logging onto the server without providing said primitive with information elements identifying the client and the user, but identifying a supported digest schema, by receiving back an authorization failure signal from the server with a nonce serving as a challenge for the client, by the client calculating a digest concatenating the nonce, a user password and a client identification using the supported digest schema, by the client once again logging onto the server but this time with the calculated digest, by the server recalculating the digest using the supported schema and using the nonce and the client password and client identification extracted by the server from the digest provided by the client, and by the server comparing the re-calculated digest to the provided digest and accepting the login if they match.

According to a third aspect of the invention, a device for communicating identification information over a network with a primitive having information elements with a structure recognized by at least one other entity able to communicate over said network, comprises means for providing the primitive with an information element identifying a client of the device, and means for providing the primitive identifying the client also with an information element identifying a user of the client.

Further according to the third aspect of the invention, the primitive comprises an update presence primitive for use in communicating presence information to the network.

Further still according to the third aspect of the invention, the primitive comprises an unsubscribe presence primitive for communicating a request to the network to discontinue receipt of selected presence information.

Still further according to the third aspect of the invention, the primitive comprises a leave group primitive for communicating a request to discontinue participation in a group to said network.

Further still according to the third aspect of the invention, the primitive comprises a create group primitive for communicating a request to create a group to the network.

Further still according to the third aspect of the invention, the primitive comprises a delete group primitive for communicating a request to delete a group to the network.

Still further according to the third aspect of the invention, the primitive comprises a get group information primitive for communicating a request for group information to the network.

Further still according to the third aspect of the invention, the device comprises means for providing said primitive with an information element identifying a client of another device, and means for providing the primitive with an information element identifying a user of the client of the another device.

Still further according to the third aspect of the invention, the primitive comprises a get presence primitive for communicating a request for presence information to the network.

Further still according to the third aspect of the invention, the primitive comprises a subscribe presence primitive for communicating a request to subscribe to presence information to the network.

Still further according to the third aspect of the invention, the primitive comprises a message primitive for communicating a message to the network.

Further still according to the third aspect of the invention, the primitive comprises an invite user primitive for communicating a request to invite a user to the network.

Further still according to the third aspect of the invention, the device is characterized by the at least one other entity comprising at least one server, by the client first logging onto the server without providing the primitive with information elements identifying the client and the user, but identifying a supported digest schema, by receiving back an authorization failure signal from the server with a nonce serving as a challenge for the client, by the client calculating a digest concatenating the nonce, a user password and a client identification using the supported digest schema, by the client once again logging onto the server but this time with the calculated digest, by the server recalculating the digest using the supported schema and using the nonce and the client password and client identification extracted by the server from the digest provided by the client, and by the server comparing the re-calculated digest to the provided digest and accepting the login if they match.

Further still according to the third aspect of the invention, the at least one other entity uses the information element identifying a client of the terminal device and the information element identifying a user of the client to distinguish the user and the client.

According to a fourth aspect of the invention, a server for communicating identification information over a network with a primitive having information elements with a structure recognized by clients able to communicate with the server over the network, comprises means for communicating the primitive with an information element identifying a client, and means for communicating the primitive identifying the client also with an information element identifying a user of the client.

Further according to the fourth aspect of the invention, the primitive comprises an update presence primitive for use in communicating presence information.

Further still according to the fourth aspect of the invention, the primitive comprises an unsubscribe presence primitive for communicating a request to discontinue receipt of selected presence information.

Still further according to the fourth aspect of the invention, the primitive comprises a leave group primitive for communicating a request to discontinue participation in a group.

In still further accord with the fourth aspect of the present invention, the primitive comprises a create group primitive for communicating a request to create a group.

Further still according to the fourth aspect of the invention, the primitive comprises a delete group primitive for communicating a request to delete a group.

Still further according to the fourth aspect of the invention, the primitive comprises a get group information primitive for communicating a request for group information.

Further still according to the fourth aspect of the invention, the server further comprises means for communicating the primitive with an information element identifying another client, and means for communicating with an information element identifying a user of the other client.

Still further according to the fourth aspect of the invention, the primitive comprises a get presence primitive for communicating a request for presence information.

Still further according to the fourth aspect of the invention, the primitive comprises a subscribe presence primitive for communicating a request to subscribe to presence information.

Further still according to the fourth aspect of the invention, the primitive comprises a message primitive for communicating a message.

Still further according to the fourth aspect of the invention, the primitive comprises an invite user primitive for communicating a request to invite a user.

Further still according to the fourth aspect of the invention, the server further comprises means for first receiving a login message from the client without the primitive with information elements identifying the client and the user, but identifying a supported digest schema, means for providing back an authorization failure signal to the client with a nonce serving as a challenge for the client, means for receiving from the client a digest calculated by the client concatenating the nonce, a user password and a client identification using the supported digest schema, and means for recalculating the digest using the supported schema and using the nonce and the client password and client identification extracted from the digest provided by the client, for comparing the re-calculated digest to the provided digest and for providing a result signal to said client accepting the login if they match.

Further still according to the fourth aspect of the invention, the server has means for using the information element identifying a client of the terminal device and the information element identifying a user of the client to distinguish the user and the client.

In Internet instant messaging only the user name is meaningful: the address of the IM client is usually not important, since the capabilities of the IM client (in a PC environment) tend to be same and are usually based on the capabilities of the software provided by the IM service provider.

In mobile instant messaging, however, the users may have multiple accesses, even at the same time and the identification of the IM client is important. The instant messages may be directed only to a user's PC session, to the user's instant messaging service or to all of the user's sessions. On the other hand part of the user-related information (presence information) tends to be actually tied to the particular IM client, such as the capabilities, reachability and availability information. Thus, two-level identification allows the integration of the mobile instant messaging to the Internet based instant messaging more effectively.

In Internet-based instant messaging, identification is usually based on user name and the non-visible hardware address of the accessing IM client.

This invention adds a visible, manageable client identification to the IM service so that messaging, presence and chat services can be directed to IM user for all clients or IM user accessing via particular IM client. Similarly, presence values can be tied to IM user as a whole (mood, etc) or IM user within particular IM client (In network, etc.).

BRIEF DESCRIPTION OF THE DRAWINGS

FIG. 1B is a more detailed layer diagram in accordance with an embodiment of the present invention.

FIG. 2B shows identification of IM user and IM client, according to the present invention.

FIG. 4D shows details of functional blocks for carrying out both the subscribed presence service and the unsubscribed presence service at a presence server, according to the present invention.

BEST MODE FOR CARRYING OUT THE INVENTION

Figure 1A:
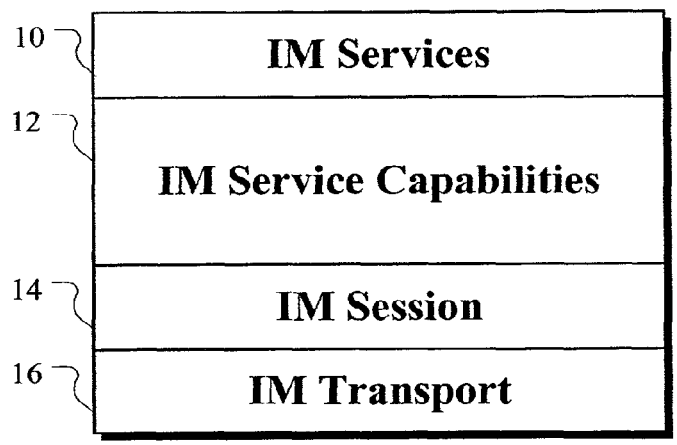
FIG. 1A is a diagram showing the protocol layer stack in accordance with an embodiment of the present invention.

A model for instant messaging that is divided into four layers is presented in FIG. 1A. The four layers comprise a top IM services layer 10, a next lower IM service capabilities layer 12, a next lower IM session technologies layer 14, and a bottom IM transport technologies layer 16. The top IM services layer 10 includes IM services such as chat, dating, meeting and conferencing. The next lower IM service capabilities layer 12 includes a high-level protocol description including primitives with information elements and message flows. Instant messaging services will be able to use these service capabilities as a toolbox to create various services. An exemplary division of service capabilities is shown in FIG. 1B. The next lower IM session layer 14 includes mapping of capabilities through existing sessions, such as MMS (Multimedia Message Service), SIP (Session Initiation Protocol), SMS (Short Message Service), USSD (Unstructured Supplementary Data). The bottom IM transport layer 16 includes definitions of how to use transports: TCP/UDP/IP (Transport Control Protocol/User Datagram Protocol/Internet Protocol), SMS/USSD as bearer, WAP/WSP (Wireless Application Protocol/Wireless Session Protocol). The following disclosure will address the IM service capabilities layer at the IM client and a similar layer at the IM server.

As mentioned, the IM service capabilities layer 12 includes message flows, names of primitives (messages) that are exchanged and defines the information elements in the abstract messages. It also suggest the technologies that may be selected in this level (such as encoding of information elements).

Figure 2A:
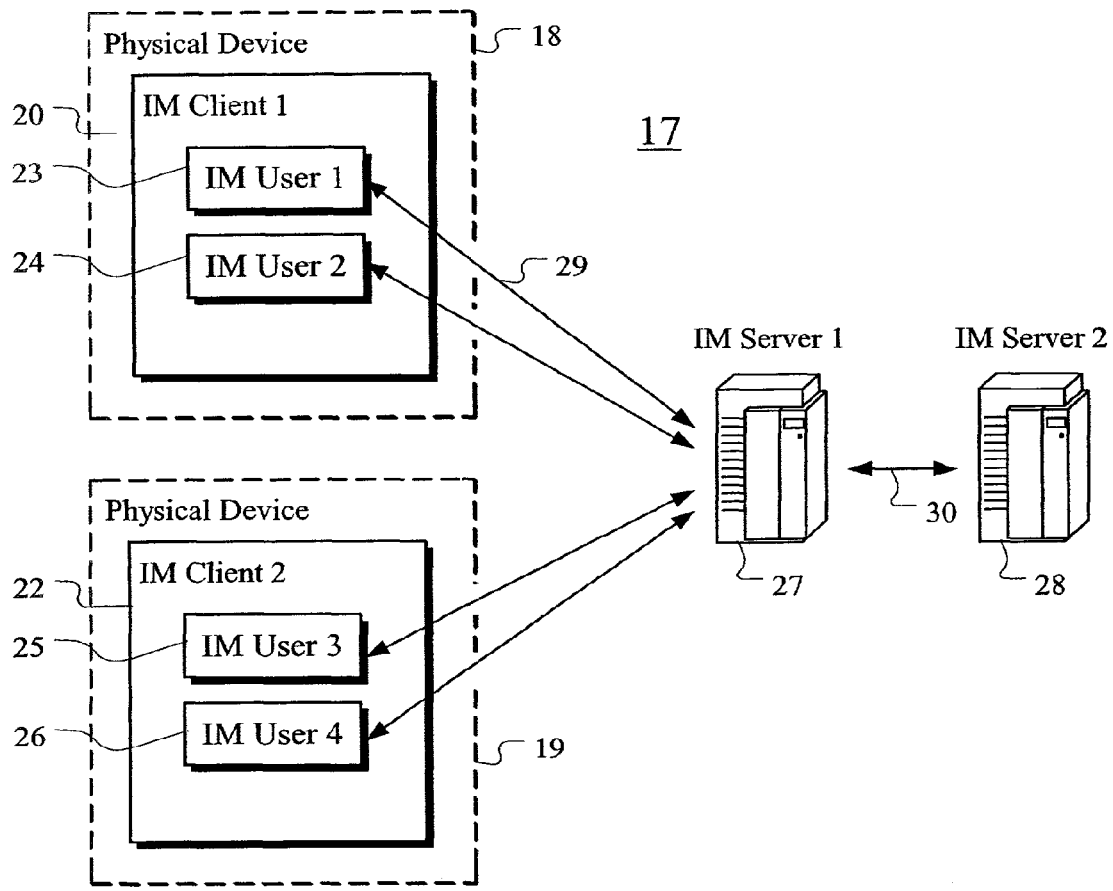
FIG. 2A is a diagram showing a model instant messaging system in accordance with an embodiment of the present invention.

FIG. 2A shows an IM System 17 comprises physical devices 18, 19, IM Clients 20, 22, IM Users 23, 24, 25, 26 and IM Servers 27, 28. An IM User is a customer of the IM System, enjoying the instant messaging service provided by using the physical devices 18, 19. An IM Client is an implementation of the IM service which allows one or more IM Users to access the service. The IM client may be hardware, software, firmware, or any combination thereof. The IM Client concept is device-independent but for purposes of actual use is installed in a physical device. Although not shown in FIG. 2A, more than one client can be resident on a given physical device and the same user can access different clients on the same device. For instance, a not shown IM client 3 could be installed on device 19 and accessed by IM User 3. An IM Server is a network element providing the IM services and maintaining user data. The IM Servers may be interconnected.

An IM User may access the IM Server simultaneously from several IM Clients (using a single device or multiple devices). Similarly, an IM Client may provide simultaneous access for several IM Users. The same IM users accessing simultaneously to a same group are separated via identification of a join session.

To repeat, a physical device, e.g., mobile handset or PC, may have one, or in special cases, multiple IM client instances. In those special cases, the multiple IM client instances may need to be separately identifiable. But for many cases, the device identity and the client identity can be considered the same. In those cases, for all intents and purposes, the physical device is therefore the same as the client. The present invention describes a method to separate the identities of the user of the instant messaging service from the client with which the instant messaging service is being used. It should be evident, however, that the assignment of separate identities can be extended, according to the teachings hereof, to cover the device itself, as well as the client(s) which may reside on a given device. In messaging, presence and chat type services the present invention can be extended to allow the addressing of the user, the clients, i.e., the particular running applications, and the device on which the clients are operating.

Referring to FIG. 2B, the access to an IM system is identified by two addresses: the IM user address, which comprises an IM user address and a possible password for authentication and an IM client address which identifies the particular device or IM client that is used to access the IM system. If the capability to address multiple clients on the same device is included in the system, and device identification is desired, then the concept of FIG. 2A can be extended to cover multiple client identifications and device identification.

When an IM user accesses the IM system, the IM client needs to provide both IM user identity (IM User-ID) and IM client identity (IM Client-ID). The IM user identity is obtained from the IM user, whereas the IM client itself provides the IM client identity.

The IM system uses the IM user identity for all purposes that affect the IM user: sending information to the IM user, charging and billing purposes etc. The IM system uses the IM client ID for all purposes that affect either the IM client only (routing of messages to IM client) or to both IM user and IM client (messages to the IM user accessing via specific IM client).

The IM user identity is further decomposed to user name and password. The password is used for simple authentication when low-level authentication is not available.

The IM client identity is further decomposed to a client name and client address. The client name is a name used to send and receive messages to the IM user accessing via specific IM client and record information based on IM client. The client address can be used to provide a low-level mapping between the device running IM application(s) and the specific IM client within the device.

Both the IM clients and servers of FIG. 2A will have a layered approach such as shown in FIG. 1A for facilitating provision of the instant messaging and presence services of the present invention. But the servers intermediate the clients will not usually utilize the topmost layer, i.e., the IM Services layer 10. For instance, as shown in FIG. 1B, an IM client having the layered structure of FIG. 1A will communicate over a communications link with an IM server having a similar layered structure, except not having the topmost IM services layer. The IM server will, in turn, communicate ultimately with other clients either directly or through other servers, and those clients will have IM service layers in the same way the IM client of FIG. 1B has such an IM services layer. As mentioned, the IM services layer includes services such as chat, dating, meeting and conferencing.

The IM service capabilities layer 12 is particularly disclosed herein and comprises a high-level protocol description with message flow, primitives and information elements defined. The IM session layer includes mapping of capabilities to existing sessions such as MMS, SIP, SMS, USSD, etc. The IM transport layer defines how to use transports: TCP/UDP/IP, SMS/USSD as bearer, WAP/WSP, etc.

Focusing on the IM service capabilities layer 12, this layer may include various components, as shown. One of these, for instance, may be a messaging part 12c, wherein the exchange of instant messages, including rich content, it provided for. The presence component may contain two parts 12a, 12b as disclosed below and provides for the exchange of wide-ranging user status, such as reachability, mood, location, etc. User group management 12d involves management of chat rooms and other community aspects. Content management 12e provides for management of shared content, such as images and documents. Subscriber management 12f is also provided for. These same components are shown on the IM service side as "IM client technologies" and subscriber/interconnection management.

Therefore, from the foregoing it will be understood that an IM user such as shown in FIG. 2A is a customer of an IM system. An IM client such as shown in FIG. 2A is an implementation instance for instant messaging in a client device, such as a mobile handset or personal computer. As mentioned above, an IM user such as shown in FIG. 2A may access simultaneously the IM service by different IM clients. IM servers are interconnected to exchange messages and other information. For this purpose, IM user addressing uses user names related to IM subscribers. As also shown above, for IM client addressing, device addressing plus client-identification may be utilized.

Figure 2C:
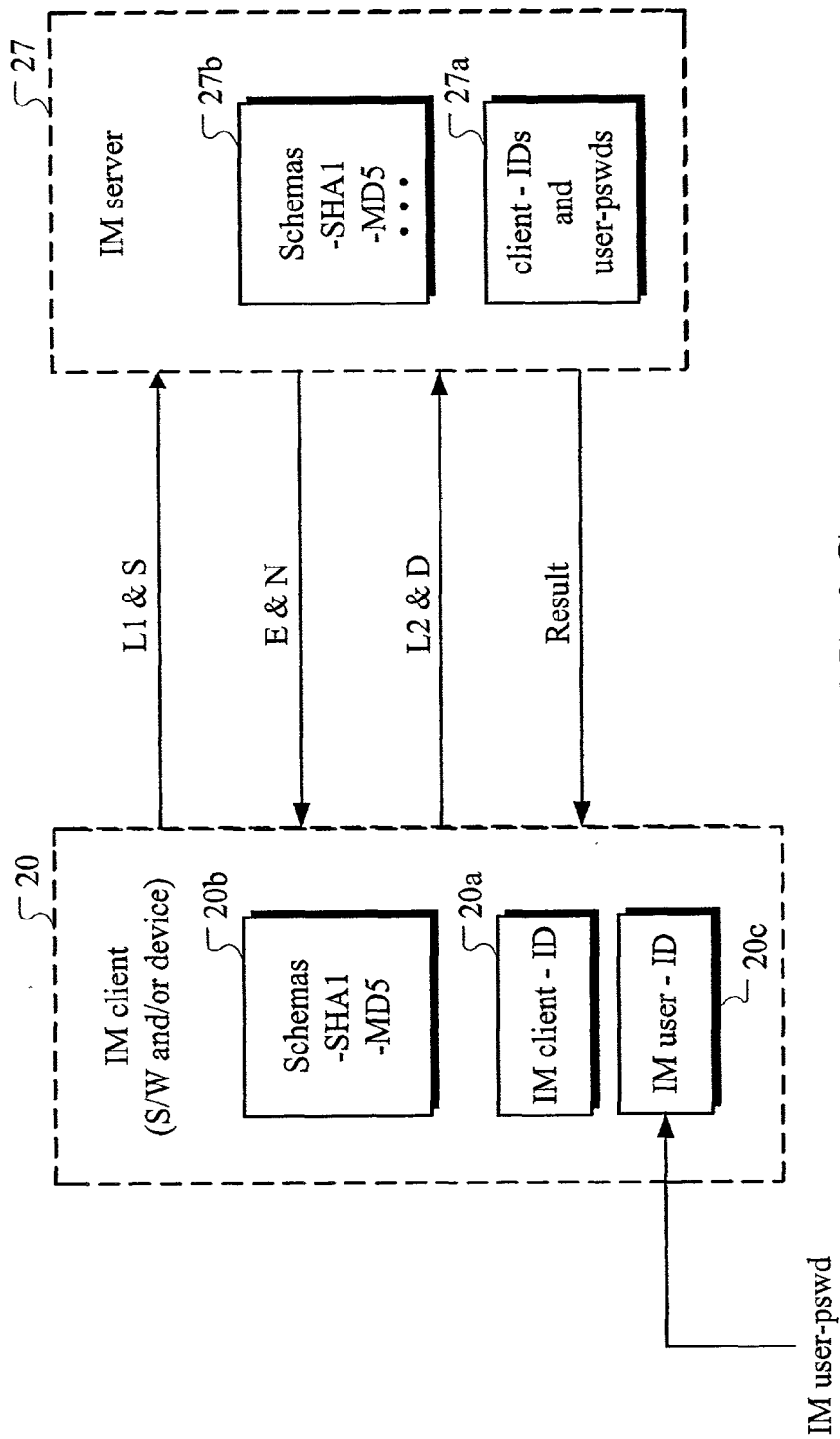
FIG. 2C is a block diagram/flow diagram illustrating a challenge-response protocol followed in authenticating an IM user and an IM device to an IM server, according to the present invention.

FIG. 2C shows an example in which the separation of user and client identities can be usefully applied. FIG. 2C shows an authentication protocol indicated as the exchange of various messages L1 and S, E and N, L2 and D, and Result, between the IM server 27 and the IM client 20 operated by an IM user (not shown). The authentication protocol confirms for the IM server 27 that the IM client 20 and IM user are indeed both entitled to access the services of the IM server, i.e. are both subscribing entities. It is important to understand that both the IM user and the IM server are being authenticated by the protocol here; in other words, the authentication will block access by someone (a user) who is not a subscribing IM user, and will not allow anyone, regardless of whether they are a subscribing IM user, access to the IM server using a device or software that is not a subscribing IM client.

Still referring to FIG. 2C, as indicated, the IM server 27 includes a data store 27a of client IDs and user-passwords (user-pswds) indicating subscribing devices and/or software and users, respectively; it also includes a schema module 27b able to produce so-called digests of messages (character strings that are encrypted representations of the messages) according to one or more schemas, such as Standard Hash Algorithm 1 (SHA1), as set out for example in RFC3174, or Message Digest 5 (MD5), as set out in RFC1321, both RFC3174 and RFC1321 being so-called "Request for Comments" documents published by the Internet Engineering Task Force (IETF).

Still referring to FIG. 2C, according to the authentication protocol used in the preferred embodiment, the IM client 20 first sends to the IM server 27 a null logon message L1, i.e. a logon that includes neither the user password nor a client-ID, and sends with the null logon L1 a message S indicating a schema implemented in the IM client 20 in a schema module 20b (typically able to ex*p+4×cute several different schemas). The digest produced by a schema can be considered a usually compressed and always encrypted version of the message.

In response to the null password, the IM server 27 sends to the IM client 20 an error message E along with a so-called nonce N, which is understood to be a challenge. A nonce is a character string constructed by the challenging entity (here, the IM server 27) according to a predetermined prescription. A recommended nonce is the digest of the concatenation:

$$N=H(\text{client-ID}|\text{time-stamp}|\text{private key}), \quad (1)$$

where a|b indicates concatenation of strings a and b, and where H( . . . ) is for example SHA1( . . . ) or MD5( . . . ), and is here called a hash function. If the argument of the hash function is a concatenation of strings including a key, the output of the hash function may be unlocked, or unencrypted, using an appropriate key. Such an output is called a digest. If the argument does not include a key, the output of the hash function may never (practically speaking) be inverted, and the output serves merely as a checksum (albeit still a character string of some length usually considerably larger than one).

When the IM client 20 receives the nonce N, it provides a second logon message L2, again null, but this time accompanied by a digest D calculated according to:

$$D=H(N|\text{user-password}|\text{client-ID}). \quad (2)$$

The IM client 20 includes within it or has access to means 20a, 20b for providing an IM client-ID and an IM user ID to be used by the IM client 20 in accessing the services offered by the IM server 27. The user password is provided to the IM client 20 by the user (not shown).

In response to the second logon L2 and accompanying digest D, the IM server 27 decrypts the digest D, extracts the user-password and client-ID, checks that both are in its data store 27a of subscribing clients and users, and then calculates for itself a digest D' using the nonce N it provided to the IM client 20 and using the client-ID and user-password it extracted from the digest D. If D' matches D, then the user is authenticated and the IM server 27 accepts the login, and otherwise does not. The outcome of the authentication process is then provided by the IM server 27 to the IM client 20 as a result message Result.

Figure 2D:
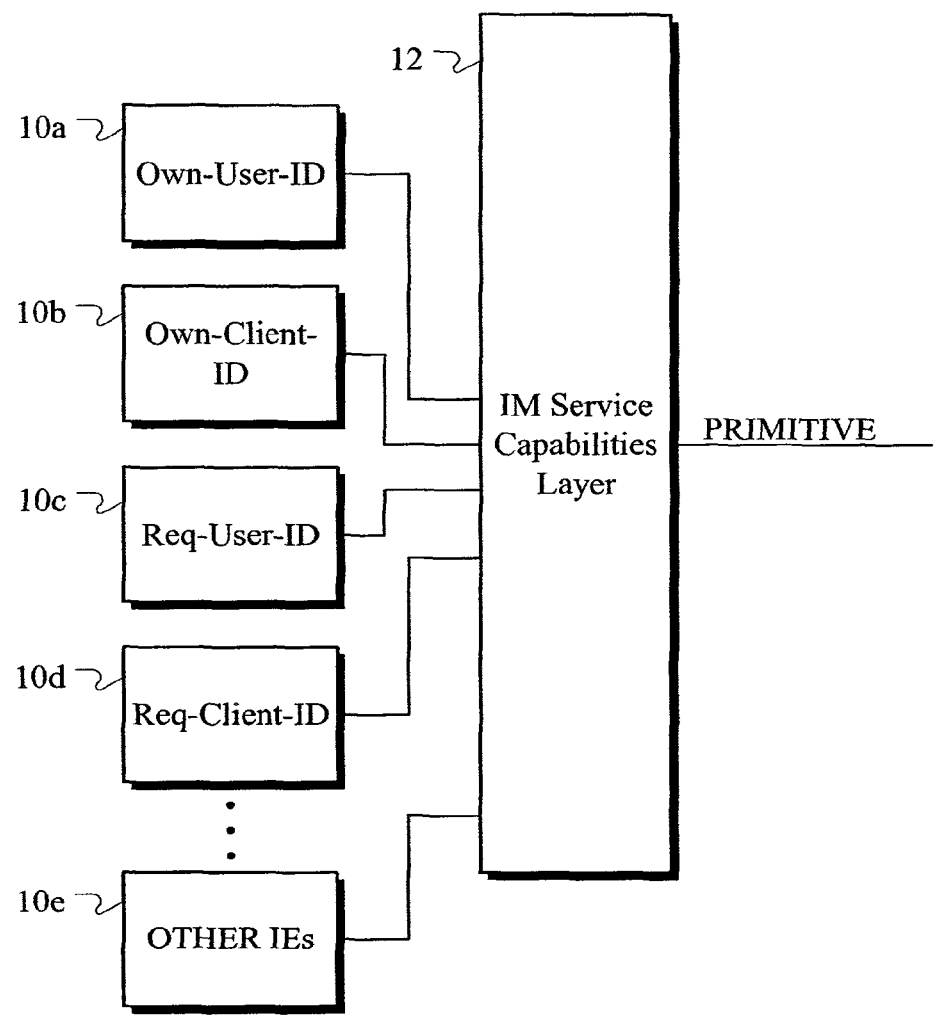
FIG. 2D shows various means for providing information elements for assembly into an outgoing primitive or disassembly from an incoming primitive at the IM Service Capabilities layer, according to the present invention.

FIG. 2D shows that for a given outgoing primitive that e.g. the client provides from the IM Service Capabilities layer 12, there will be various means 10a, 10b, 10c, 10d, . . . , 10e for providing the constituent information elements for combination into the given outgoing primitive. These means 10a, 10b, 10c, 10d, . . . , 10e may be part of or associated with the IM Services layer 10 or part of or associated with the IM Service Capabilities layer 12. On the server side for the case of receiving a primitive from a client, it is a similar situation, but the reverse, i.e., the illustrated IM Service capabilities layer is used for receiving an incoming primitive and disassembling the primitive for providing the constituent information elements for individual use or in combination at the server and/or for repackaging and relaying the information elements elsewhere in the network. For the case of a primitive provided from the server to a client the reverse of the foregoing applies. In other words, the client disassembles information elements from primitives received from and assembled by the server.

Referring now to FIG. 1B, an IM client such as the IM client 20 of FIG. 2 and an IM server such as the IM server 27 of FIG. 2 are shown with appropriate layers illustrated and interconnected by a signal line 29 which may include a wireless link. A signal line 30 is shown to indicate a connection, for instance to another IM server such as the IM server 28 of FIG. 2 (not shown in FIG. 1B). It is noted that the IM client 20 of FIG. 1B has all four of the layers 10, 12, 14, 16 discussed previously in connection with FIG. 1A, while the IM server 27 of FIG. 1B only has (illustrated on the left-hand side of the server) the three lowermost layers 12, 14, 16. This is because the IM server 27 is only an intermediate node in the overall connection between the IM client 20 and one or more other IM clients at end points of the communication. Only they need the topmost IM services layer 10 to be implemented. Consequently, it will be understood that the present invention does not involve the details of the IM services themselves, but rather is focused on the IM service capabilities layer 12 (and the corresponding IM Client Technologies layer 27a at the server), which provides the underlying capabilities for implementing the IM services but does not relate directly to the IM services themselves.

The IM service capabilities layer at the client and the IM Client Technologies layer at the server provide a communications protocol between themselves that uses a data structure including a plurality of primitives, each primitive for at least temporary storage in a computer-readable medium at a transmitting end of the communication link 29 and for at least temporary storage in a computer-readable medium at a receiving end of the link. Each primitive is assembled at the transmitting end and transmitted to the receiving end where it may be disassembled and processed or repackaged for further transmittal.

Various components of the IM service capabilities layer 12 are shown in FIG. 1B and will be discussed in greater detail throughout this specification. For instance, presence services 12a, 12b will be disclosed below involving exchange of wide-ranging user status, such as reachability, mood, and location. Under messaging 12c, exchanges of instant messages, including rich content, will be disclosed. Under user group management 12d, management of chat rooms and other community aspects are disclosed. Under content management 12e, management of shared content, such as images and documents, is disclosed. Subscriber management 12f is not a subject of the present invention so is not discussed below. However, it is also shown at the IM service capabilities layer 12 for completeness, since subscriber management as well as inter-connection management 27b are also shown on the right-hand side of the IM server 27 of FIG. 1B at the same level. This represents management of IM subscriptions but is beyond the scope of the present invention. Likewise, interconnection management, involving management of interconnections between servers for IM purposes, is not the subject of the present invention and is not disclosed further below. Management and interconnection details at the session and transport layers are also not disclosed, since they do not form any part of the present invention.

Presence

The concept of presence means all kind of status information of a particular mobile or fixed network user. It has great potential when combined to instant messaging service particularly for a mobile user, but has significant value as its own service as well, such as combined with a phone book, etc. Thus, in this disclosure, the presence service is considered separately as well as connected to chat-type services.

1. Unsubscribed Presence

Figure 3A:
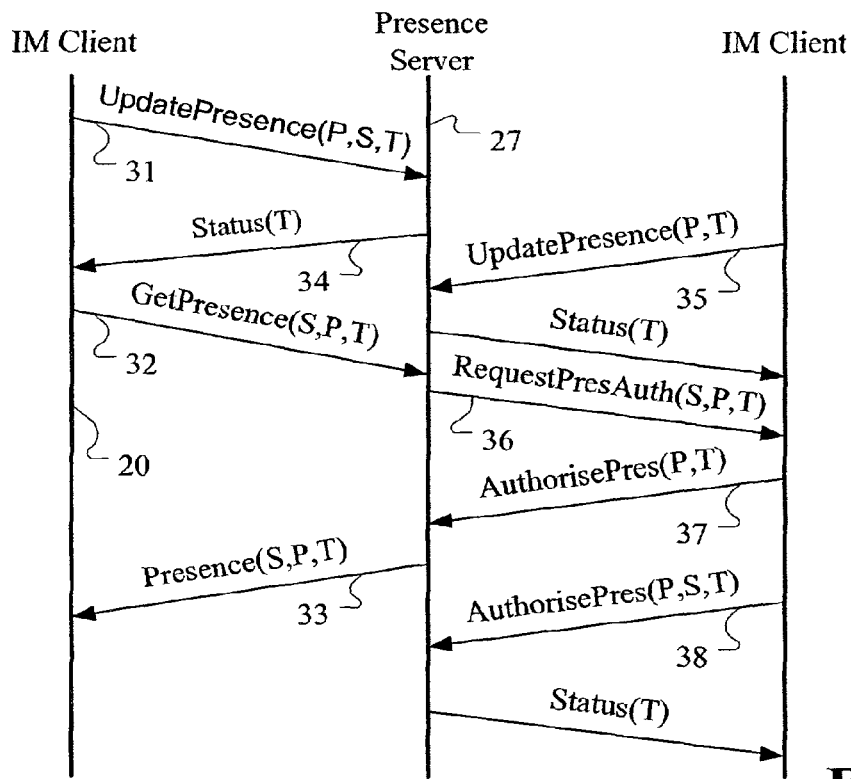
FIG. 3A is a flow diagram of unsubscribed presence, according to the present invention.

The presence information of a user can be obtained separately from messaging services by issuing a query to the presence server, as indicated in the message flows presented in FIG. 3A.

The user of a presence service may, at any suitable time, autonomously update his presence information in the presence server by sending an update presence message 31 via an IM client (P=presence values; S=status; T=transaction identifier). Similarly, a user may issue a get presence message 32 to request the presence information of some other user. The presence information 33 is delivered back to the requesting user.

Figure 11A:
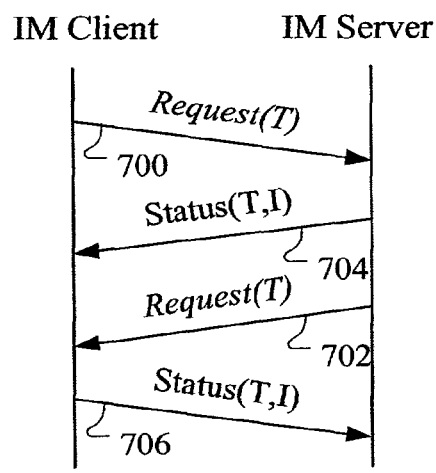
FIG. 11A is a session diagram showing general error handling in a transaction, according to the present invention.

A status message may be provided on a line 34 from the presence server to the IM client to indicate success or lack of success of the update presence message or operation. Exception handling will be discussed in detail below in connection with FIG. 11A and will not be discussed further in connection with FIGS. 3A-10A, except for being shown in the message flow diagrams (FIGS. 3-10 with an "A" suffix). It will therefore be understood that these status messages may be sent as shown in accordance with the discussion provided below in connection with FIG. 11A.

It should be understood that the IM user may update his presence information only partially. Similarly, the IM user may request only partial presence information.

The user may create and delete new presence values when the presence server supports such functionality. This mechanism allows the expansion of presence values beyond a minimum set of values. This also requires a generalized method in IM client to present values to IM user that are not understood as such by the client. A new presence value is created with update presence value message 35.

The get presence mechanism 32 includes an optional authorization sequence. When somebody requests presence information of a user, an authorization request 36 may be sent to the user to authorize the presence information, as shown by an authorization message on line 37. If authorization fails, a presence message with empty content is sent to the requesting user on the line 33. The authorization of presence information may also be pre-authorized so that user can separately indicate that it is willing to provide his presence information to some other, named IM users, without specific request, as indicated on a line 38.

An IM user may authorize his presence information only partially, even if requesting IM user wants to receive full presence information.

Figure 3B:
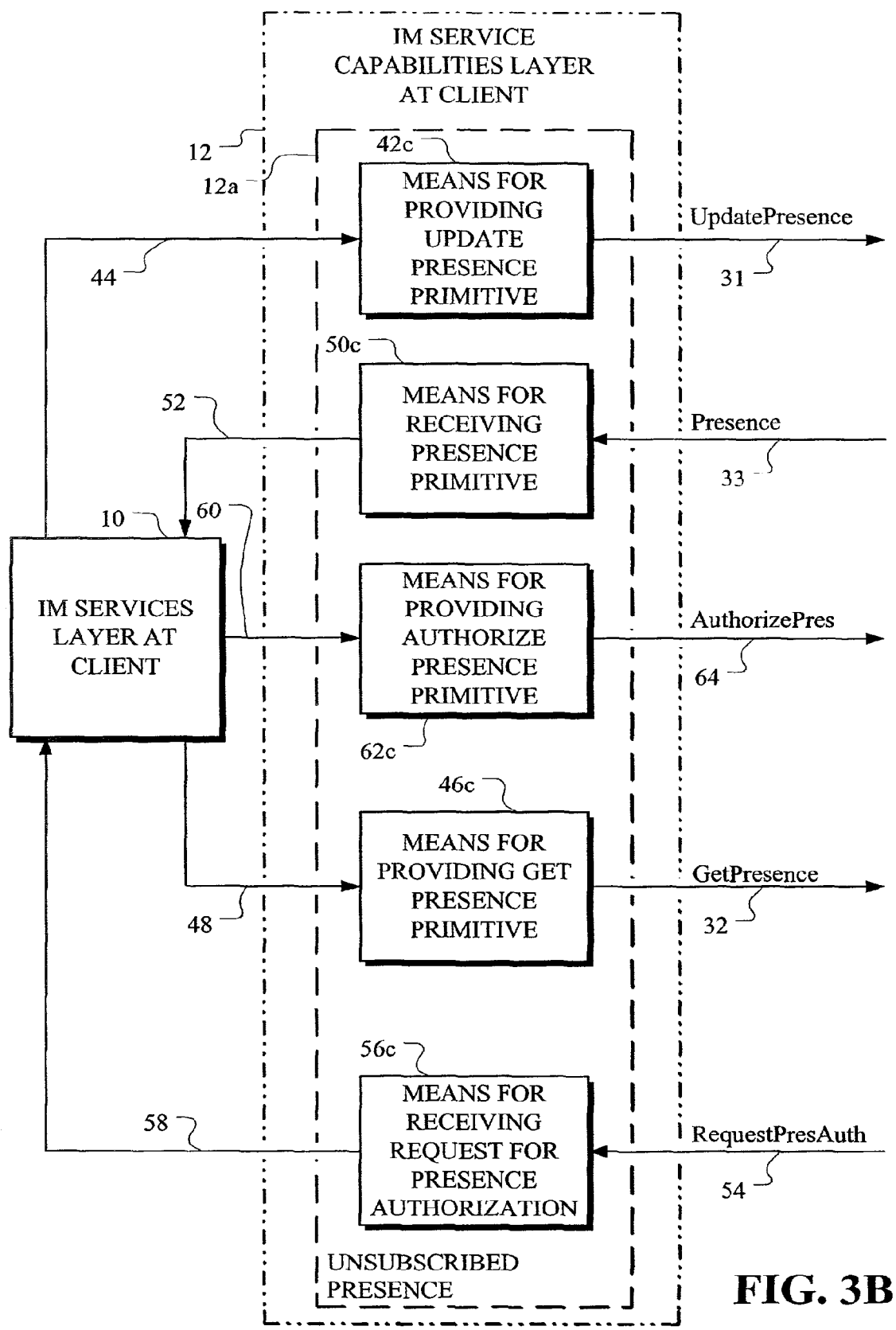
FIG. 3B shows details of the IM service capabilities layer at an IM client for carrying out an unsubscribed presence service at the client, according to the present invention.

FIG. 3B shows the IM services layer 10 at the IM client 20 interfacing with the unsubscribed presence part 12*a* of the IM service capabilities layer 12. The UpdatePresence primitive of FIG. 3A provided on the line 31 is shown coming from a means 42*c* for providing the UpdatePresence primitive to the server. This UpdatePresence primitive is shown in more detail in Table 2, as comprising various information elements which may be provided on a line 44 from the IM services layer 10 at the client to the means 42*c* for assembling these information elements and providing them as the UpdatePresence primitive on the line 31. From there it goes to the IM session layer 14 of the client (see FIGS. 1A and 1B) and thence to the server via the transport layer 16. Similarly, a means 46*c* is provided that is responsive to a plurality of information elements provided on a line 48 from the IM services layer 10, including a number of information elements such as listed in Table 3 for assembling same and providing them as the GetPresence primitive on the line 32. In response, the server will consult any existing pre-authorization or will obtain such authorization from the user from whom presence is desired via the client presently being used by the requested user, and once secured, the requested presence information of that user will be provided within the Presence primitive provided on the line 33 to means 50*c* for receiving the Presence primitive. This Presence primitive will have information elements such as shown in Table 4, and these information elements will be provided by the means 50 on a line 52 to the IM services layer 10 at the client.

In the case of a client (not shown) connected, for instance, to IM server 28 of FIG. 2 and desiring the presence information of IM client 20, the requesting IM client will issue a RequestPresAuth primitive, which will be conveyed on the line 30 to the IM server 27, which in turn will provide the primitive via the line 29 to the client 20 and from there on a line 54 to means 56*c* for receiving a request for presence authorization. The RequestPresAuth primitive may include information elements such as shown in Table 5. These information elements may then be provided on a line 58 to the IM services layer 10 at the requested client, as shown in FIG. 3B. In response, the IM services layer at the client may provide information elements on a line 60 to a means 62*c* for providing an authorization presence primitive on a line 64 back to the server 27. The authorized Presence of the client 20 may then be provided from the server 27 on the line 30 to the requesting client (not shown). Information elements such as shown in Table 6 may be used for the AuthorizePres primitive. Therefore, although FIG. 3A shows the authorization process in a way so as to illustrate an end-to-end scenario, it will be realized that a user of a given client will have the capability to obtain the presence information of other users of other clients, as well as to authorize presence information gathering with respect to the user of the given client. This is shown in the IM service capabilities layer 12 at a single client in FIG. 3B. Therefore, it should be realized that the RequestPresAuth and AuthorizePres primitives shown on lines 54, 64 of FIG. 3B are in essence the same primitives as shown on lines 36, 37 of FIG. 3A, except being illustrated with respect to the same client, not different clients, as in FIG. 3A.

Figure 3C:
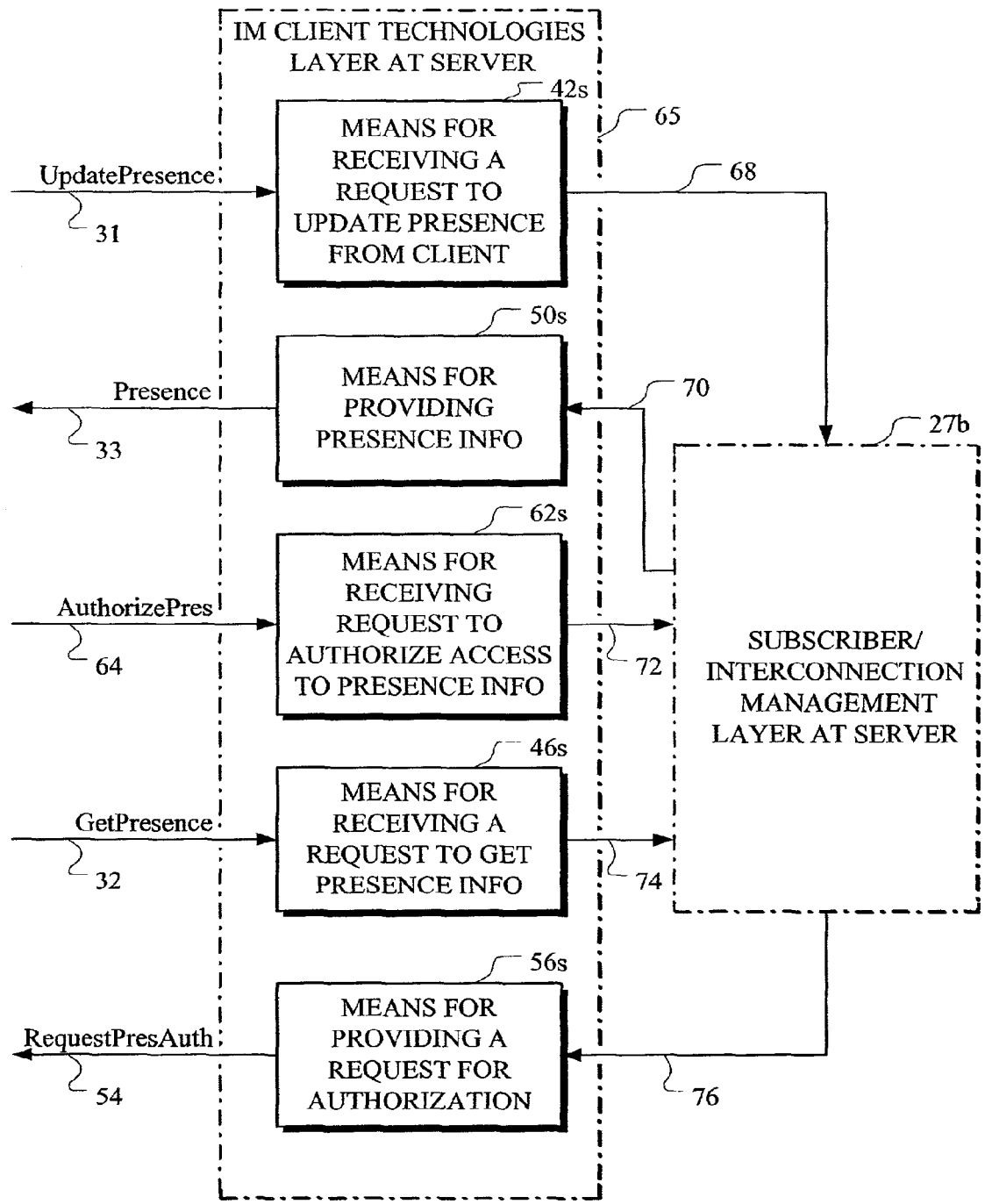
FIG. 3C shows details of a subscriber/interconnection management layer at a presence server for carrying out an unsubscribed presence service at the presence server, according to the present invention.

Referring now to FIG. 3C, the same primitives shown in FIG. 3B are shown again at the server side. Like the IM service capabilities layer at the client, the server has an IM client technologies layer 65, with means 42*s*, 50*s*, 62*s*, 46*s*, 56*s* corresponding to the means 42*c*, 50*c*, 62*c*, 46*c*, 56*c* of FIG. 3B. These provide information elements and receive information elements to and from the subscriber/interconnection management layer 27*b* at the server. These correspond to the subscriber management and interconnection management portions 27*b* of the top layer shown in the IM server of FIG. 1B at the same level as the IM service capabilities layer 12 of the client. Therefore, it will be realized that the IM client technologies layer 65 shown in FIG. 3C corresponds to the IM client technologies portion of the top layer shown in FIG. 1B and that the primitives interchanged over the line 29 correspond to the primitives 31, 33, 64, 32, 54 shown in FIGS. 3B and 3C. The information elements contained in these primitives are processed at the IM client technologies layer 65 and provided on lines 68, 72, 74 to the subscriber/interconnection management layer 27*b* at the server, or received from the subscriber/interconnection management layer 27*b* of the server on lines 70, 76. These information elements are processed by the IM server 27 in order to accomplish both IM client technologies functions corresponding to IM service capabilities on the clients and subscriber management and interconnection management across servers in the network.

Figure 4A:
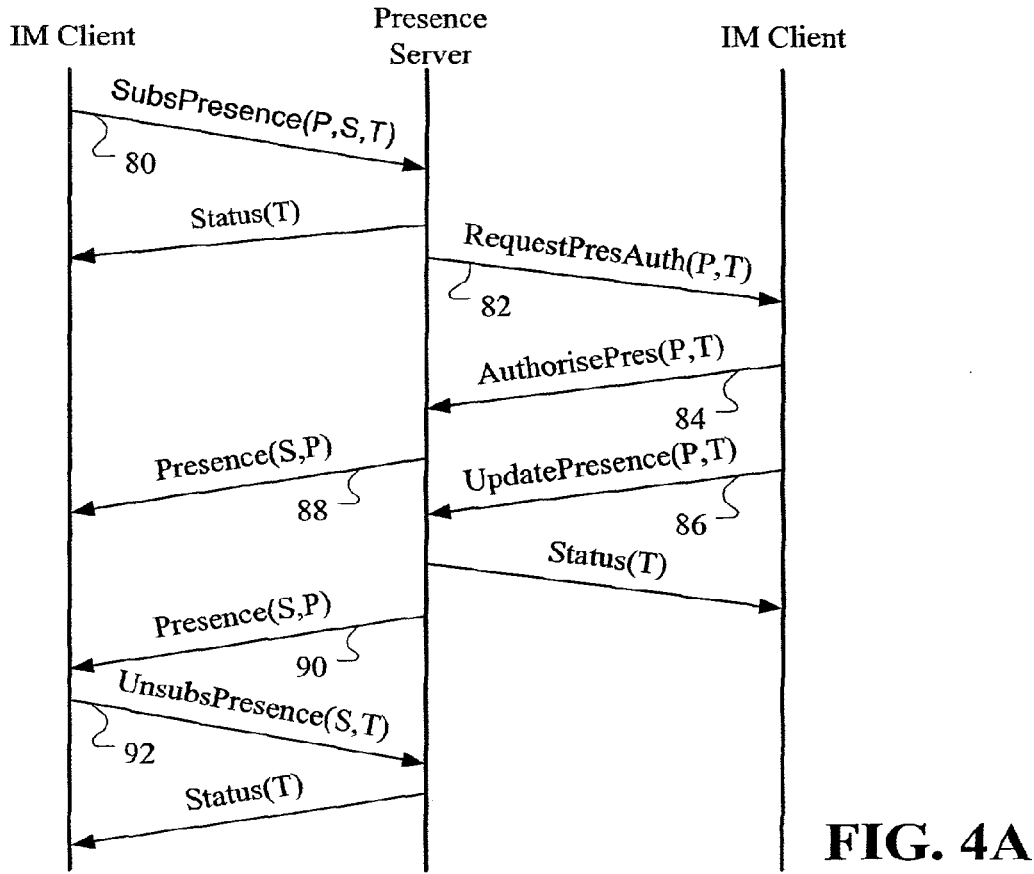
FIG. 4A is a session diagram showing subscribed delivery of presence information, according to the present invention.
Figure 4B:
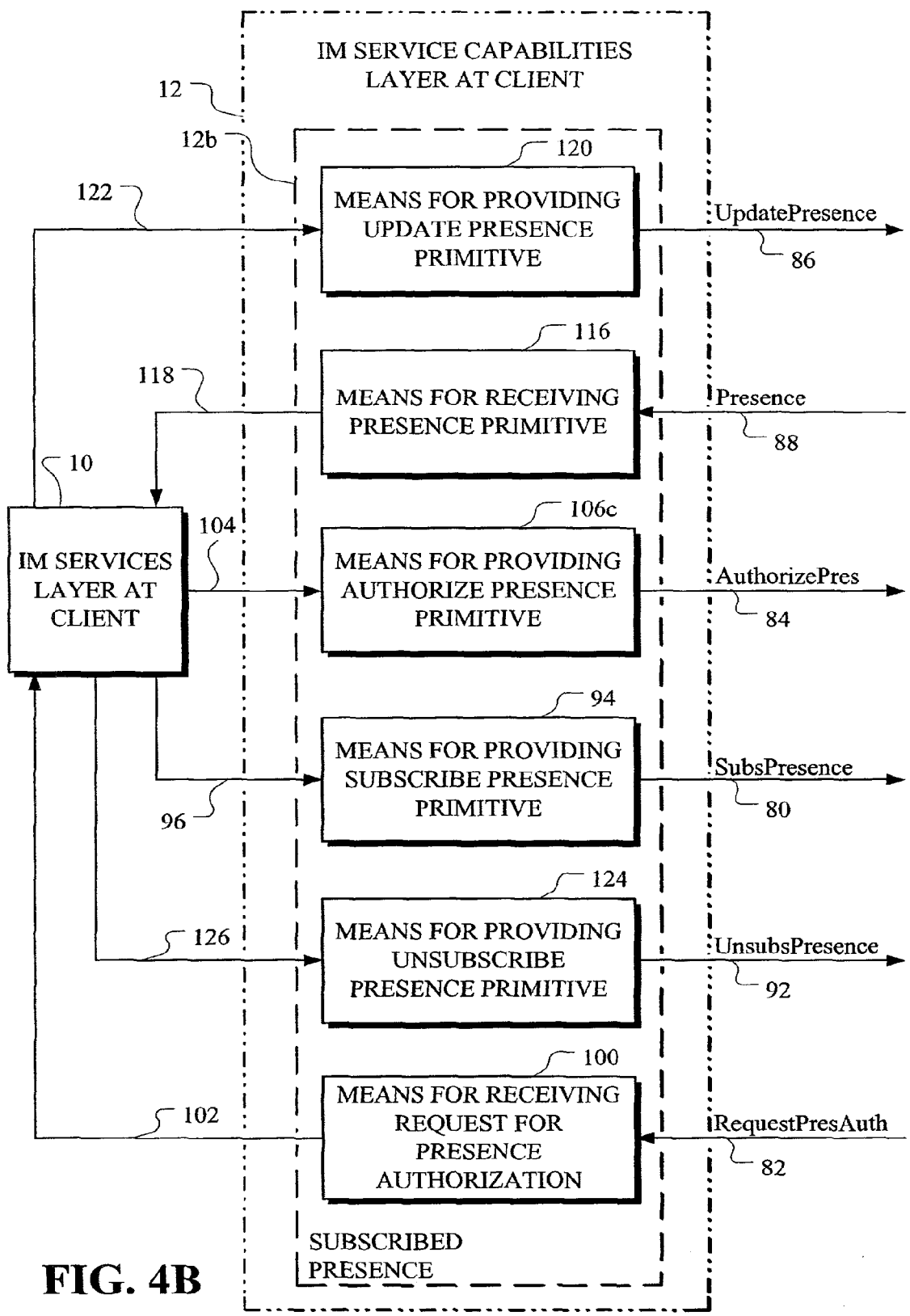
FIG. 4B shows details of an IM service capabilities layer at an IM client for carrying out a subscribed presence service at a client, according to the present invention.
Figure 4C:
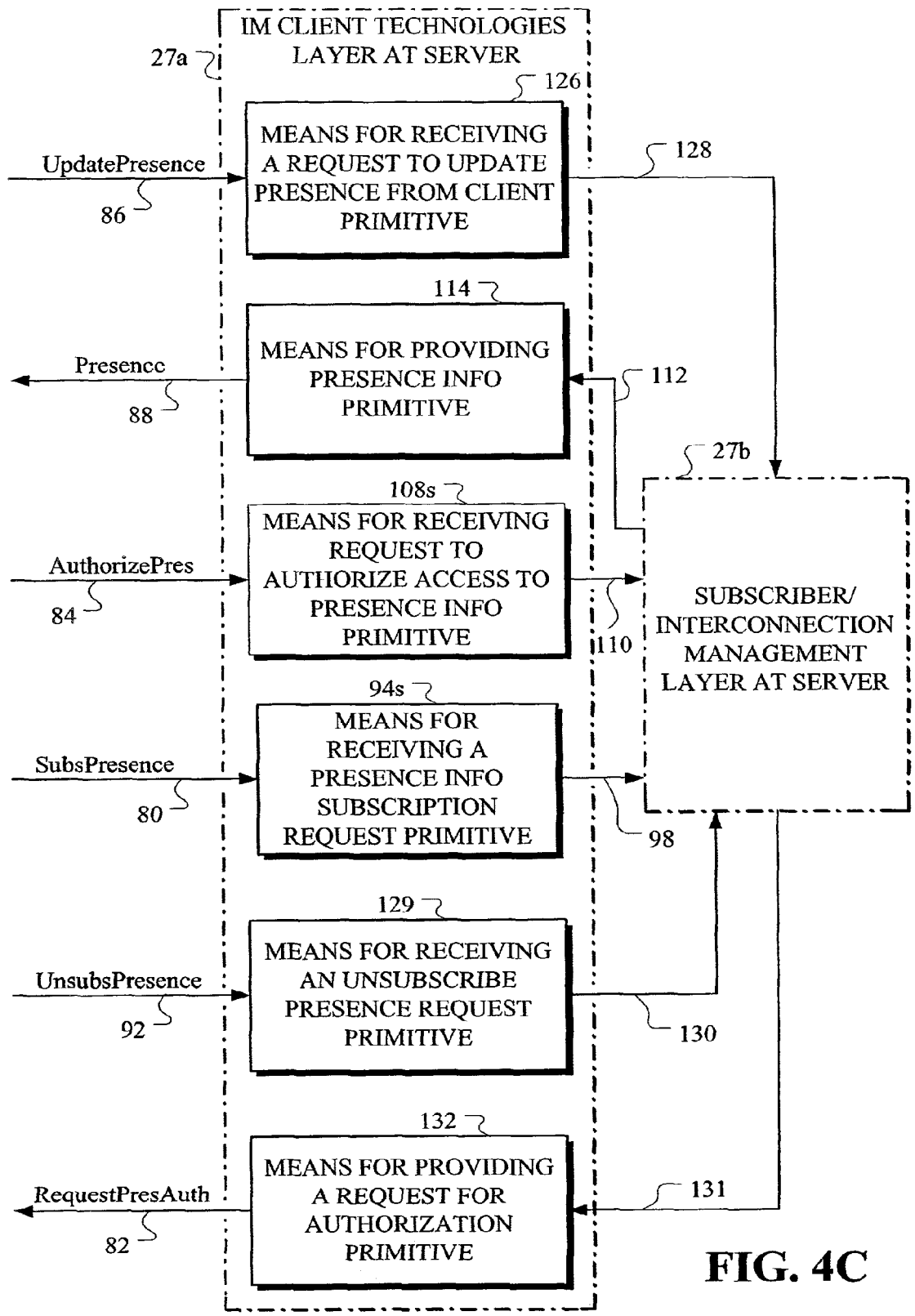
FIG. 4C shows details of a subscriber/interconnection management layer at a presence server for carrying out a subscribed presence service at the presence server, according to the present invention.

For all of the IM services described in the message flow diagrams of FIGS. 4A, 5A, 6A, 7A, 8A, 9A, 10A and 11A, a similar client/server presentation will be made of the IM service capabilities layer for both the IM client 20 and the IM server 27. The figures illustrating the client side of the IM service capabilities will be labeled FIGS. 4B, 5B, 6B, 7B, 8B, 9B, 10B and 11B. The IM server 27 side of the IM service capabilities layer will be correspondingly labeled FIGS. 4C, 5C, 6C, 7C, 8C, 9C, 10 and 11C. All these drawings should be understood in the same sense as just described in connection with the unsubscribed presence service of FIG. 3A. In other words, what is illustrated in a given grouping of, for instance, FIGS. 4A, 4B, 4C, is the flow of primitive messages between IM clients and presence servers, along with an illustration of the device or means for carrying out the message flows at the IM service capabilities layer 12 and the IM client technologies layer 27a, according to the present invention, which respectively reside at the IM client and the IM server, as shown in FIG. 1B.

As such, they are independent entities or data structures capable of storage on a physical medium and which may be processed by a signal processor resident on a physical device.

2. Subscribed Presence

Another mechanism to receive presence information is to subscribe to someone's presence information. The message flow is presented in FIG. 4A.

The requesting user sends a subscribe presence message 80 to the presence server to subscribe to someone's presence information. An authorization sequence 82, 84 similar to that with unsubscribed presence may be included. The authorization may also be done autonomously 86 prior to or after subscription.

When the subscription to presence information is complete, the requesting user will receive 88 new presence information initially and always 90 when the other party updates its presence information.

When the requesting user does not want to receive the presence information any more, he may unsubscribe 92 from receiving the presence party's information.

Alternatively, the presence information may be subscribed to for a time period and the unsubscribe message 92 is not needed because it expires in the Presence Server automatically after the time period elapses.

The requesting user may subscribe to only part of the presence information and, correspondingly, the user whose presence information is subscribed may allow only part of the presence information to be delivered.

The subscribe presence message 80 of FIG. 4A is also shown in FIG. 4B being provided by the presence portion 12b of the IM service capabilities layer 12 at the client. It is provided by a means 94 in response to a plurality of information elements provided on a line 96 from the IM services layer 10 at the client. These information elements may be as shown in Table 7 and may be assembled by the means 94 and provided on the line 80 as the SubsPresence primitive on the line 80 for processing in the IM session layer 14 and the IM transport layer 16 of the client for transmission on the line 29 to the IM server 27, where it is shown in FIG. 4C entering a means 94s after processing by the IM transport layer and the IM session layer of the IM server 27. The information elements of Table 7 of the primitive SubsPresence on the line 80 are provided on a line 98 to the subscriber/interconnection management layer 27b at the IM server 27.

The IM server 27 then seeks authorization either by preauthorization or by interrogating the IM client whose presence information is requested. The requested client will have an IM service capabilities layer the same or similar to that shown in FIG. 4B and will receive a RequestPresAuth primitive on the line 82 which is provided in the interrogated client to a means 100 for receiving the request for presence authorization. The information elements of this primitive may be as shown in Table 5 and are provided on a line 102 to the IM services layer at the requested client. Authorization may then be granted and authorization information elements as shown in Table 6 provided on a line 104 to a means 106c for providing the AuthorizePres primitive on the line 84 back to the server, which receives same in a means 108s and provides the Table 5 information elements on a line 110 to the subscriber/interconnection management layer 27b at the server 27. The server then provides information elements shown in Table 4 on a line 112 to a means 114 for providing the Presence primitive on the line 88 to the requesting client of FIG. 4B, where the primitive is received by a means 116. The information elements comprising the presence primitive are provided on a line 118 to the IM services layer at the requesting client's IM Services Layer.

As mentioned, presence may be updated autonomously by the IM client 20, and such can be done as shown in FIG. 4A by the UpdatePresence primitive on the line 86 provided by a means 120 for providing such a primitive in response to information elements such as shown in Table 2 provided on a line 122 from the IM services layer 10 of the client 20. This information is stored at the presence server and avoids the necessity for requesting a presence authorization with the RequestPresAuth primitive on the line 82.

Finally, the UnsubsPresence primitive is provided on the line 92 by a means 124 at the subscribed presence portion of the IM service capabilities layer at the client. The IM services layer 10 provides the information elements such as those shown in Table 8 on a line 126 to the means 124 for providing the unsubscribe presence primitive on the line 92.

Referring again to FIG. 4C, the autonomous presence update embodied by the UpdatePresence primitive on the line 88 is shown received by a means 126 that receives such a request to update presence from a client and provides the information elements contained, for instance, in Table 2 on a line 128 to the subscriber/interconnection management layer 27b at the server 27.

A means 129 is shown at the IM client technologies layer 27a of FIG. 4C for receiving the UnsubsPresence primitive on the line 92 and provides information elements for instance as shown in Table 8 on a line 130 to the subscriber/interconnection management layer 27b at the server 27. This layer also provides information elements from Table 6 on a line 131 to a means 132 for providing a request for authorization primitive on the line 82.

With regard to the various primitives described above in connection with any of the message flow diagrams ("A" suffix) disclosed herein or device diagrams (B & C suffix) such as FIGS. 4A, 4B, and 4C, it should be realized that each of the illustrated primitives constitutes a data structure for assembly and for at 4× least temporary storage in a computer-readable medium at a transmitting end and for at least temporary storage, disassembly and processing at a receiving end. In other words, referring for instance to FIGS. 4B and 4C, the update presence primitive provided on the line 86 by the means 120 is assembled from information elements listed in Table 2 and provided for instance on the line 122. As such, the information elements are at least temporarily stored in the means 120 prior to being provided on a transport medium on the signal line 86 to the server. Similarly, referring to FIG. 4C, the update presence primitive is received on the line 86 by the means 126 and at least temporarily stored within the means 126 for disassembly into individual information elements and/or for processing as a primitive in the server for further transmission. As such, the primitives disclosed above and the other primitives to be disclosed in more detail below constitute data structures exchanged between a client and a server, one at the transmitting end and one at the receiving end, to convey information in an instant messaging and/or presence context. The primitives have information elements including message identifiers, transaction identifiers, and the like. The information shared between the clients is communicated by these data structures or primitives with servers acting as intermediaries over a network. The primitives and their constituent information elements have structures that are recognized by both the servers and clients so that they can be properly interpreted in the context of the services provided.

Although details of the physical device 18, 19 used, according to the present invention, at the IM service capabilities layer 12 of the client or at the IM client technologies layer of a server have been shown in FIGS. 3B, 3C and 4B, 4C with respect to presence services by showing various means within the IM service capabilities layer at the client cooperating with the IM services layer at the client, and by showing various means of the IM client technologies layer at the server cooperating with the subscriber/interconnection management layer at the server, it will be realized that the functions carried out at the respective IM services layer at the client and the client technologies layer at the server can instead be carried out in whole or in part within other layers besides the IM service capabilities layer at the client and the IM client technologies layer at the server. For instance, referring to FIG. 4D, no particulars layers are identified but functional blocks are instead shown to illustrate some of the functions carried out at the presence server, according to the present invention. A presence server is shown with functions combined from both FIGS. 3A and 4A includes means 133 for receiving presence information requests whether they be a GetPresence primitive on the line 32 or the SubsPresence primitive on the line 80 for processing such primitives and providing output signals on lines 133a, 133b indicative thereof to means 133c for processing requests requiring immediate response and to means 133d for processing subscription requests. In the case of responding to requests requiring immediate response, the means 133c provides a signal on a line 133e to a means 133f for determining if acquisition of the requested presence information is preauthorized or not. This will be true for the means 133d also since such a determination has to be made for subscription requests as well. Therefore, the means 133d provides a signal on a line 133g to the means 133f for determining if acquisition of presence information that is the subject of the subscription request is preauthorized or not. Any such preauthorization information will be stored at the server 27 already and if it is determined that such authorization is already present, a signal is provided on a line 133h to a means 133i for retrieving current presence information either from storage 133r on a line 133s within the presence server itself or as updated by updated presence information on the line 31, 86. The means 133i provides the retrieved or updated presence information on a line 133j to a means 133k for providing the presence information as the Presence primitive on the line 33, 88.

If the means 133f determines that the requested presence information has not been preauthorized, it provides a signal on a line 133m to a means 133n for requesting authorization from the client owning the requested presence information. The means 133n then provides the RequestPresAuth primitive on the line 54, 82. In response, the client owning the requested presence information will send an AuthorizePres primitive on the line 64, 84 to means 133p for receiving such an authorization primitive and providing a signal on a line 133q to the means 133f for determining if acquisition of the presence information by the requesting client has now been authorized by the requested client. If so, a signal is provided on the line 133h to the means 133i and the requested information is retrieved from storage at the server or from an updated storage mechanism for receiving recently updated presence information from clients and provided on the line 133j to the means 133k for providing the presence information as a Presence primitive on the line 33, 88 to the requesting client.

Therefore, it will be realized that various functions taught according to the present invention can be carried out by various layers of a server or client and need not be constrained to the exact structures shown herein for teaching purposes.

3. Presence Primitives and Information Elements Thereof

TABLE 1

Presence Primitives

| Primitive | Direction |
|---|---|
| UpdatePresence | IM Client → Presence Server |
| GetPresence | IM Client → Presence Server |
| Presence | Presence Server → IM Client |
| RequestPresAuth | Presence Server → IM Client |
| AuthorisePresence | IM Client → Presence Server |
| AuthoriseStatus | Presence Server -> IM Client |
| SubscribePresence | IM Client → Presence Server |
| UnsubscribePresence | Presence Server -← IM Client |

TABLE 2

UpdatePresence

| Information Element | Req | Description |
|---|---|---|
| Message-Type | Mandatory | Message identifier |
| Version | Mandatory | Version of the IM specification |
| Own-Client-ID | Mandatory | The identification of the IM client |
| Own-User-ID | Mandatory | The identification of the IM user |
| Group-ID | Optional | Identifies the IM group if involved |
| Presence-Value-List | Optional | A list of presence values to be updated |

TABLE 3

GetPresence

| Information Element | Req | Description |
|---|---|---|
| Message-Type | Mandatory | Message identifier |
| Version | Mandatory | Version of the IM specification |
| Transaction-ID | Mandatory | Identifies the presence request transaction. |
| Own-Client-ID | Mandatory | The identification of the requesting IM client |
| Own-User-ID | Mandatory | The identification of the requesting IM user |

TABLE 3-continued

GetPresence

| Information Element | Req | Description |
| --- | --- | --- |
| Req-Client-ID | Conditional | The identification of the requested IM client, if client specific presence is requested. |
| Req-User-ID | Mandatory | The identification of the requested IM user |
| Presence-Value-List | Optional | A list of presence values requested. An empty (or special value) indicates all presence values are desired. |

TABLE 4

Presence

| Information Element | Req | Description |
| --- | --- | --- |
| Message-Type | Mandatory | Message identifier |
| Version | Mandatory | Version of the IM specification |
| Transaction-ID | Optional | Identifies the presence request transaction, if involved. |
| Req-User-ID | Mandatory | The identification of the requested IM user |
| Presence-Value-List | Optional | A list of presence values supplied. |

TABLE 5

RequestPresAuth

| Information Element | Req | Description |
| --- | --- | --- |
| Message-Type | Mandatory | Message identifier |
| Version | Mandatory | Version of the IM specification |
| Transaction-ID | Mandatory | Identifies the authorization request transaction |
| Own-User-ID | Mandatory | The identification of the requesting IM user |
| Presence-Value-List | Mandatory | A list of presence values requested. |

TABLE 6

AuthorizePresence

| Information Element | Req | Description |
| --- | --- | --- |
| Message-Type | Mandatory | Message identifier |
| Version | Mandatory | Version of the IM specification |
| Transaction-ID | Mandatory | Identifies the authorisation request transaction, either originated from IM server or IM client |
| Own-User-ID | Mandatory | The identification of the requesting IM user |
| Group-ID | Optional | Identifies the group if authorisation of presence is related to group. |
| Presence-Value-List | Mandatory | A list of presence values requested. |

TABLE 7

SubsPresence

| Information Element | Req | Description |
| --- | --- | --- |
| Message-Type | Mandatory | Message identifier |
| Version | Mandatory | Version of the IM specification |
| Own-Client-ID | Mandatory | Identifies the requesting IM client |
| Own-User-ID | Mandatory | Identifies the requesting IM user |
| Req-Client-ID | Conditional | Identifies the requested IM client in case client-specific information is requested. |
| Req-User-ID | Mandatory | Identifies the requested IM user |
| Presence-Value-List | Optional | A list of presence values requested. An empty (or special value) indicates all presence values are desired. |

TABLE 8

UnsubsPresence

| Information Element | Req | Description |
| --- | --- | --- |
| Message-Type | Mandatory | Message identifier |
| Version | Mandatory | Version of the IM specification |
| Own-Client-ID | Mandatory | Identifies the requesting IM client |
| Own-User-ID | Mandatory | Identifies the requesting IM user |
| Req-User-ID | Mandatory | Identifies the requested IM user |

4. Presence Format

In addition to the two models for acquisition of presence information and the model for instant messaging disclosed above and in further detail below, the present invention also contains provision to allow future expansion of presence values for presence services. It provides for the definition of a minimum set of registered presence attributes and values and the correct management and rendering of unregistered presence values.

In the present-day Internet-based instant messaging services, the presence values are extremely simple, such as user is present or absent. This reflects the fact that presence services have mostly been confined to the desktop PC environment.

The mobile handset today can be considered as a personal tool which reflects the personal status much more accurately than the PC-based Internet environment. For instance, the exact location may be obtained directly and the availability status (in meeting, in summer cottage, etc.) may be readily available by accessing user profile settings in the handset. Considering the wide range of information that may be obtained from the user and the handset, the anticipation of the possibilities for development of the presence information domain is very difficult. As another aspect of the invention, an extensible mechanism is provided for defining presence attributes and values via classification and typing of the values.

A presence attribute identifies a presence variable. An example of an attribute would be for instance "mood." A presence value identifies a particular value of an attribute. The attribute mood can have for instance a value "happy."

The invention provides a minimum set of presence attributes and their values are defined in order to enable interoperability within the defined minimum set. However, the invention provides implementations that are not limited to the predefined set of attributes, but can handle attributes and values beyond the minimum set. This requires classification and typing of presence attributes and a generalized method in the terminal device such as a handset or PC to present these values to the user.

According to the present invention, a Presence Attribute Definition (PAD) comprises at least the following items:

Name: unanimous identification of the presence attribute;
Group: unanimous identification of the group the presence attribute belongs to;
Description: textual description of the semantics of the presence attribute;
Class: a class of the presence attribute (explained more fully below);
Type: a type of the presence value (text, integer, floating point, enumerated, etc.;
Enumeration: If type is enumerated, a list of possible enumerated values with descriptions.

The name and group of the presence attribute should contain:

1) identification of a registering entity; and
2) unanimous identification within the scope of a registering entity.

A central registry is provided to manage a set of PADs and PAD groups (PAGs) which form a minimum set of supported PADs and PAGs for inter-vendor interoperability purposes. The other registering entities may be manufacturers and other industry forums. The central registry manages the identifications of the registering entities.

A particular presence implementation (e.g., presence server or presence client), can be provided so as to support a set of PADs and PAGs. Based on inter-vendor agreements, some of the PADs and PAGs may be required in order to ensure interoperability.

If an IM implementation supports a registered PAD, it can both render the presence attribute value to the user and use the value internally based on the registered semantics of the PAD. For instance, it can use the value unhappy of the mood attribute to render it as an unhappy face icon on the display.

If an IM implementation does not support the registered PAD, it can render the presence attribute value to the user based on the class and type of the value, but it cannot assume any semantics or the PAD.

A class of presence attributes is selected for each PAD. The class may be used for instance in ordering the values while rendering them to the user and in the internal organization of the presence attribute values in the presence server. The present invention suggests at least the following classes:

Reachability (in network coverage, GPRS attached, etc).
Availability (available for IM, in meeting, busy, etc).
Personal status (mood, etc.)
Contact Information (address, phone number, etc.)
Location (user given location, geographical/network location)
Client Capabilities (image capable, audio capable, etc.)
Unknown (unknown class)

Some of the values are static and some can be dynamically updated. According to the foregoing, it will therefore be understood that an important aspect of presence format is that presence values may be created dynamically. In that case, both the format itself and its presentation to the IM user need to support this. One of the most prominent technologies that would be used to express such presence information is XML. An example of the presence value format with XML could be as follows:

```
<presvalue>
    <operation>update</operation>
    <name>profile</name>
    <class>availability</class>
    <scope>client</scope>
    <format>text charset ISO-8859-1</format>
    <value>silent</value>
    <privacy>allowall</privacy>
    <restrictedaddr>23456</restrictedaddr>
    <allowedaddr>23456</allowedaddr>
    <time>14112000165301</time>
</presvalue>
```

Operations: create, delete, update

The PAD classes are registered by a central registry.

5. Generalized Space-Time Model of Presence Values with Validity Attributes

At the present time, instant messaging services use values that exist in the presence server and all updates are done externally to it. A generalized space-time model is needed which would allow the presence server to do value updates based on internal space functions (for instance, the location of the user can be interpolated by the presence server based on the latest known locations) and times (for instance, the availability of the user can be a function of time).

The present invention permits the definition of a space-time model of presence values which identifies the presence values as a function of space and time. The space domain identifies the relation between the value and its sources. In addition, the space-time model further characterizes the presence values with a validity attribute, also being a function of space and time. This generalized space-time model of presence values allows the presence values to be considered as independent entities in the presence server in which the values are updated and modified either internally or externally based on the value source and time. The validity of the presence value may be used by the presence server to optimize the storage and caching of valid values compared to invalid values. This aspect of the invention allows the presence server not just to be updated with values from the source, but allows the modification of the values as a function of the source values and time and space. In addition, it allows the management of valid or invalid values and related storage optimizations.

A presence value $P(t, S)$ can be considered as a two-variable function of space (S) and time (t). Similarly, the validity of a presence value $V(t, S)$ can also be considered as a two-variable function of space and time. The space domain defines the relation of the presence value to the sources of the value. Validity can be considered as a continuous probability value or as a discrete value (e.g., valid/invalid).

An example would be of a space-time defined value of "availability" in a chat room. The value can be considered as a function of time and location. The value can be obtained from a calendar (as a function of time) and the network location may be used to dictate the availability (not-available at home, but available at the work place).

4. Presence Format

Presence content can be divided in the following classes:
Reachability (in network coverage, GPRS attached, etc).
Availability (available for IM, in meeting, busy, etc).
Personal status (mood, etc.)
Location (user given location, geographical/network location)
Client Capabilities Some of the values are static and some can be dynamically updated. An important aspect of presence format is that presence values may be created dynamically. In that case, both the format itself and its presentation to the IM user need to support this. One of the most prominent technologies to express such presence information is XML. An example of the presence value format with XML could be as follows:

```
<presvalue>
    <operation>update</operation>
    <name>profile</name>
    <class>availability</class>
    <scope>client</scope>
    <format>text charset ISO-8859-1</format>
    <value>silent</value>
    <privacy>allowall</privacy>
    <restrictedaddr>23456</restrictedaddr>
    <allowedaddr>23456</allowedaddr>
    <time>14112000165301</time>
</presvalue>
```

Operations: create, delete, update

Messaging

1. Messaging with a Buddy List

Figure 5A:
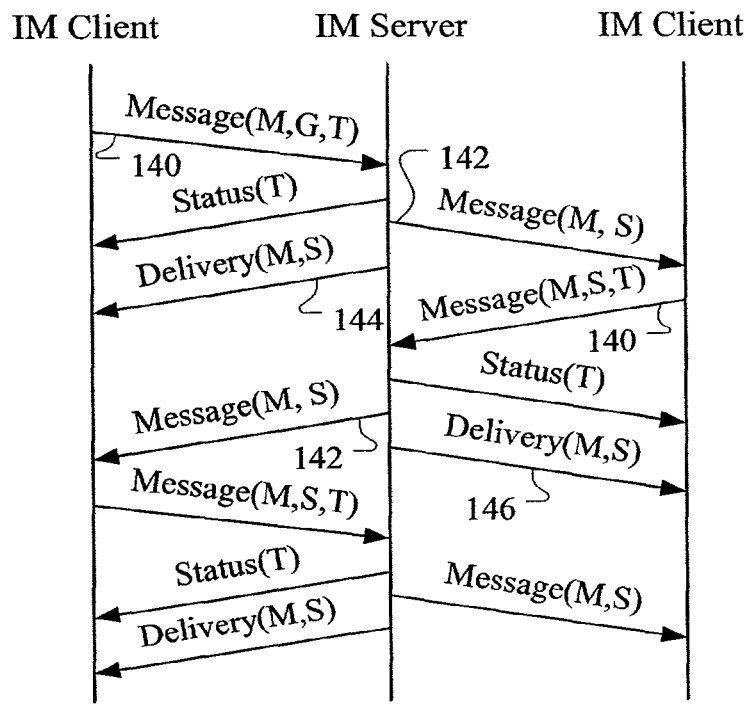
FIG. 5A is a session diagram showing messaging with buddy list.

Instant messaging via a buddy list is presented in FIG. 5A (M=message content; G=group identifier). In this messaging model, the IM user maintains one or more buddy lists on the server. The IM user owning the buddy list may send messages 140 to either one or more recipients separately or to the whole buddy list via the IM server. The recipient IM client of the relayed message 142 is not necessarily aware of the buddy list and cannot refer to the buddy list with its reply.

The presence of users in the buddy list is not an integral part of messaging with a buddy list; the information must be either requested separately or subscribed.

The originator of a message may optionally request a delivery report message 144, 146. This message is sent by the IM server to the originator when the message reaches the recipient IM client.

The management of the buddy lists is done via user group management, to be disclosed in the management of user groups subheading in detail below under the heading Subscriber and User Group Functions.

Figure 5B:
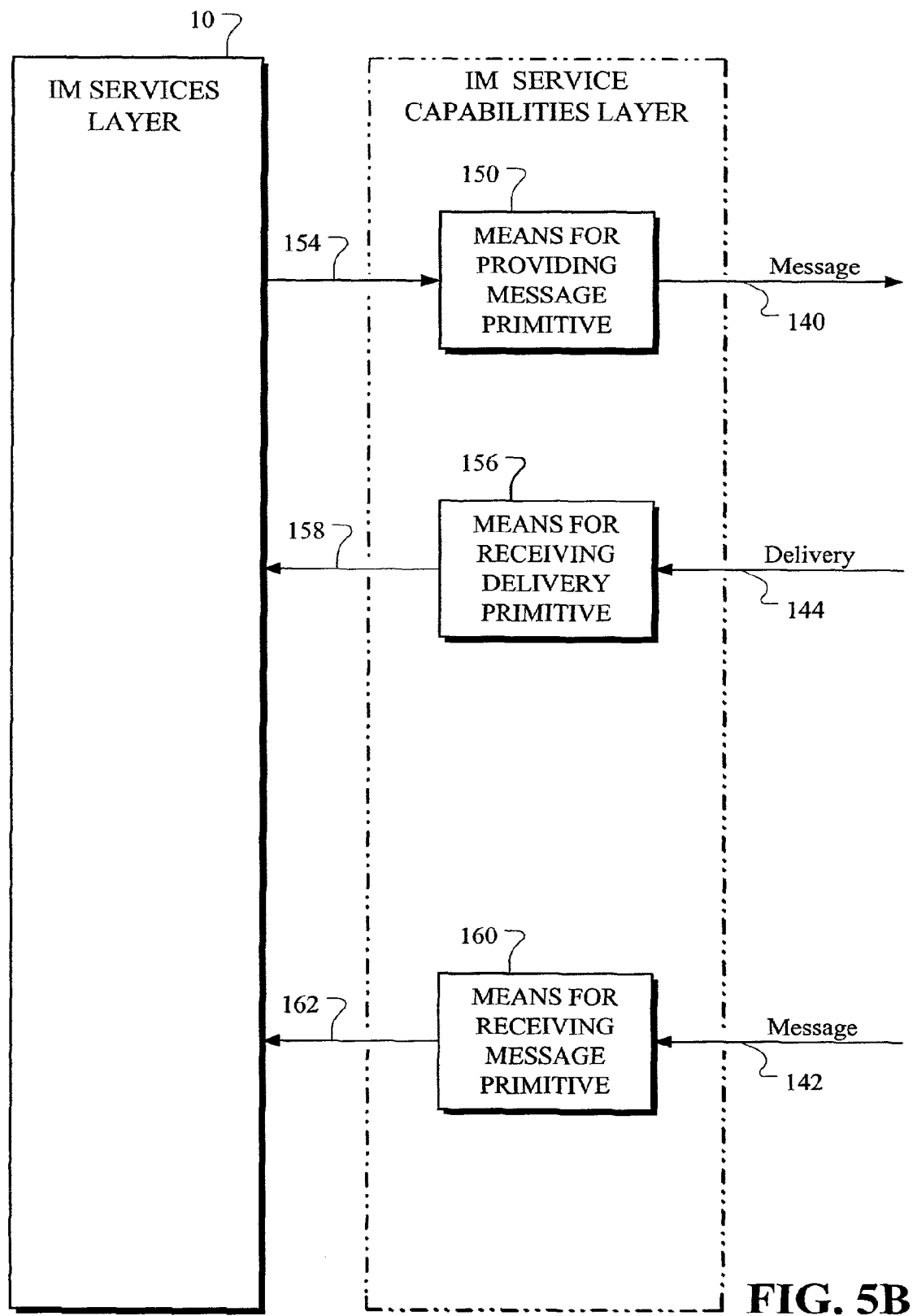
FIG. 5B shows details of an IM service capabilities layer at an IM client for carrying out messaging with buddy list service at the IM client, according to the present invention.

A buddy list part of the messaging portion of the IM service capabilities layer 12 of an IM client 20 is shown in FIG. 5B. It includes means 150 for providing a message primitive on a line 140 which may contain information elements shown in detail in Table 10 and which may be provided on a line 154 from the IM services layer 10 of the client 20. After delivery of the message by the server to the intended recipient(s) as shown by the relayed message 142 of FIG. 5A, the server provides the delivery primitive on the line 144 back to the sending client which is received in a means 156 for receiving the delivery primitive and providing information elements such as listed in Table 11 on a line 158 to the IM services layer 10 of the IM client 20. The IM client is also responsive to messages from other clients, such as the message primitive on the line 142 provided to a means 160 for receiving message primitives and providing information elements such as the information elements listed in Table 10 on a line 162 to the IM services layer 10.

Again, it should be realized that the illustration of FIG. 5B shows both the sending of the message 140 and the receiving of the same message relayed by the server in a single client even though there would be two actual clients involved, as shown in FIG. 5A. The reason that it shown this way in FIG. 5B is because both the capability to send message primitives and to receive message primitives should in most cases both be embodied in a given device in order to fully participate in bi-directional messaging. Therefore, it will be understood that the message on the line 140 that is relayed from the first IM client by the server is received on the line 142 by another IM client in the scenario described above.

Figure 5C:
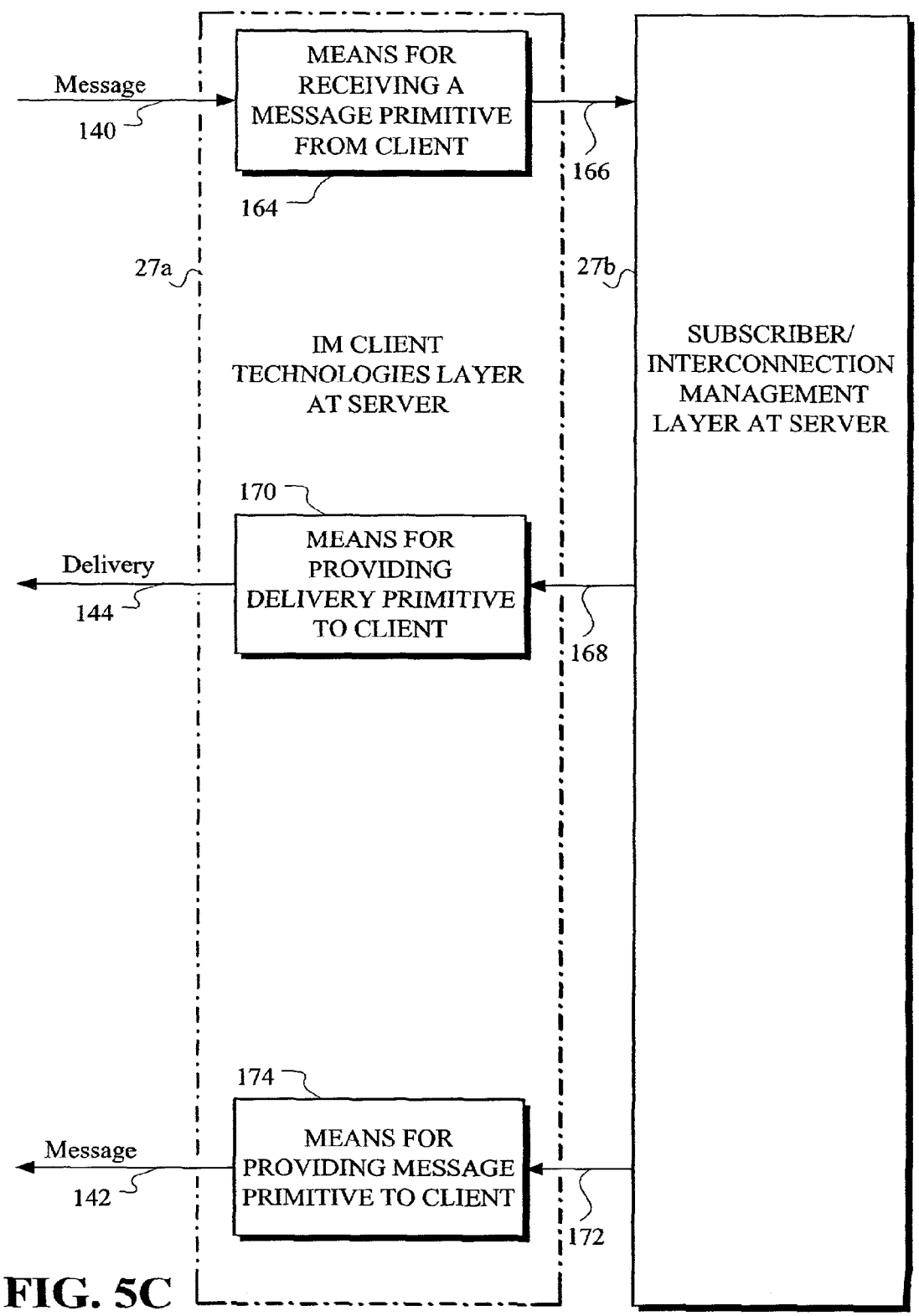
FIG. 5C shows details of a subscriber/interconnection management layer at an IM server for carrying out messaging with buddy lists, according to the present invention.

FIG. 5C shows the IM client technologies layer 27a at the server in detail as it pertains to messaging with buddy lists. The message primitive on the line 140 discussed above is received by a means 164 that provides the information elements of Table 10 on a line 166 to the subscriber/interconnection management layer 27b at the IM server 27. After the server relays the message on the line 142 to the recipient IM client, it provides the information elements of the delivery primitive, as shown in Table 11 on a line 168 to a means 170 for providing the delivery primitive to the sending client on the line 144. Similarly, the server can receive messages from other clients and in response provides information elements of Table 10 on a line 172 to a means 174 for providing message primitives to clients, as shown, for instance, by the message primitive on the line 142 to the client of FIG. 5B.

2. Messaging via Private Group

Figure 6A:
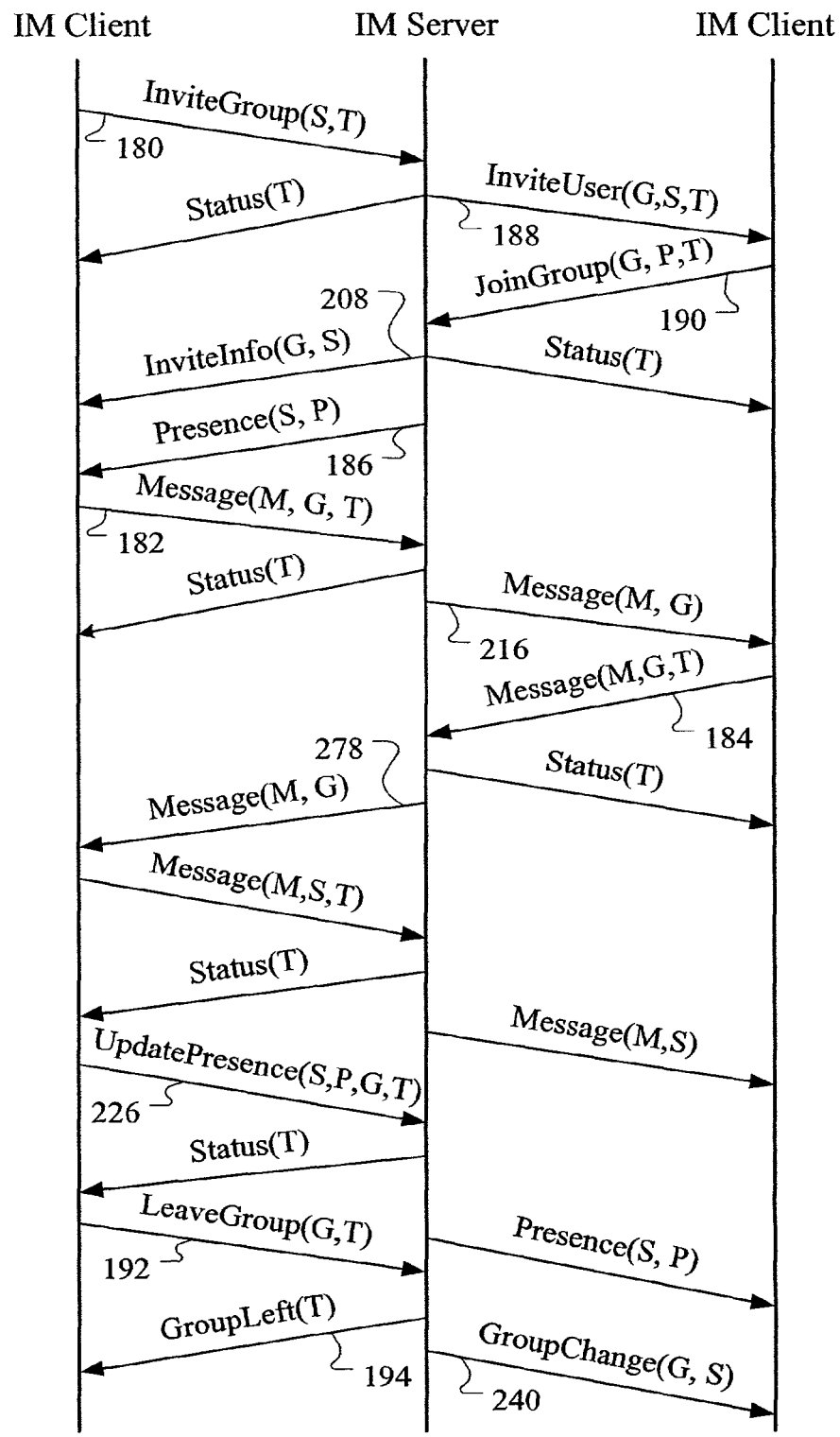
FIG. 6A is a session diagram showing instant messaging via private user group, according to the present invention.
Figure 6B:
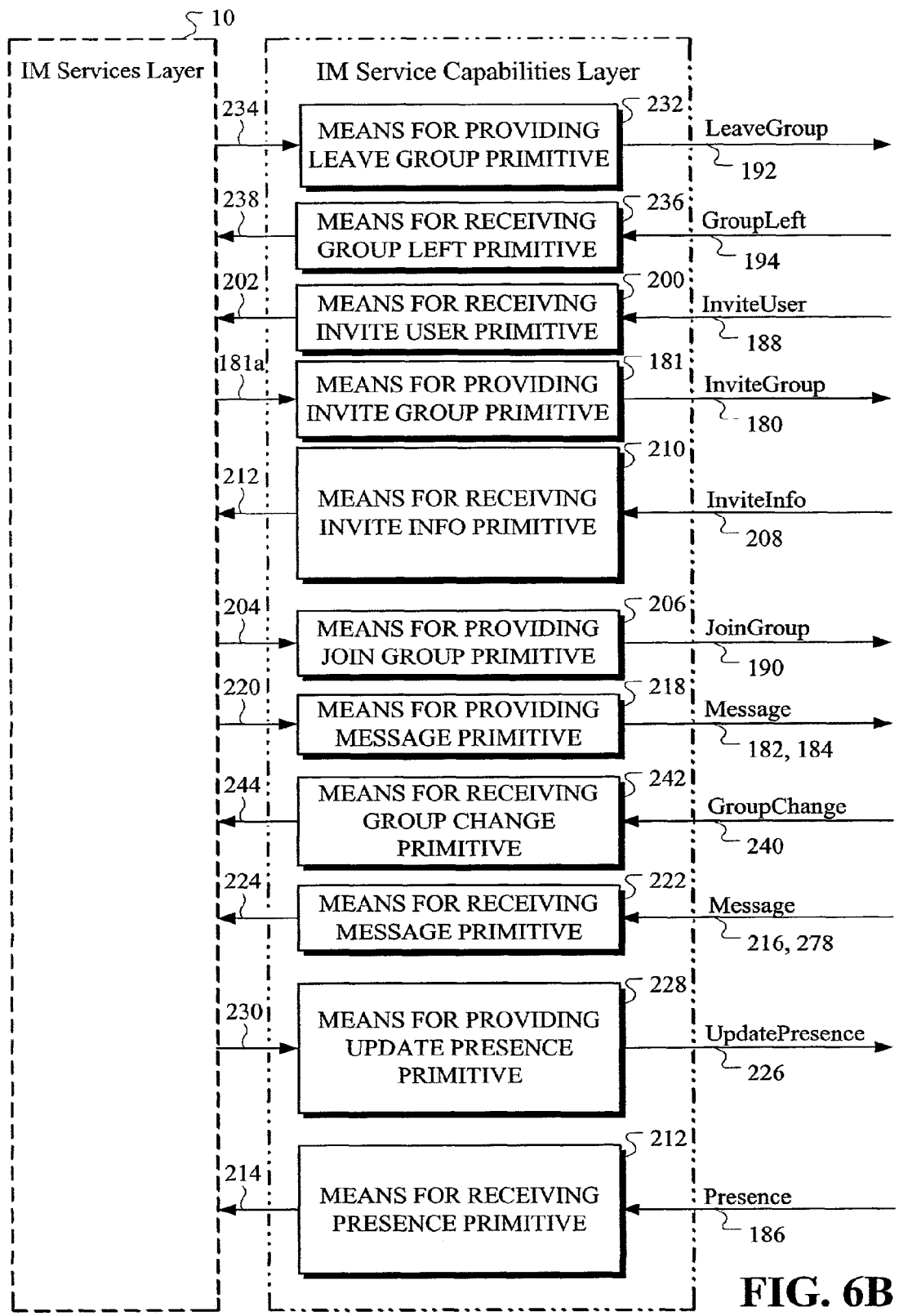
FIG. 6B shows details of an IM service capabilities layer at an IM client for carrying out private group messaging management at the IM client, according to the present invention.

Instant messaging via a private user group is presented in FIG. 6A. In this messaging model, the IM user maintains one or more private user groups on the server. The IM user may invite one or more members of the group to a chat session using an invite group message 180 (see Table 12). Referring to FIG. 6B, the InviteGroup primitive is shown on the line 180 being provided from a means 181 for providing the InviteGroup primitive in response to the information elements shown in Table 12 being provided on a line 181a from the IM services layer 10 of the client 20. This is multi-user invitation as provided by the Inv-User-List information element shown in Table 12. The changes in the group (new users joined and left) are indicated to all parties with a group info message such as that shown in Table 16.

All the users may send messages according to Table 10 either to each other privately or to all recipients in the user group.

The owner of the private user group may "kick out" i.e. involuntarily remove users from the chat session via group management operations to be disclosed below in another section.

The presence primitive of Table 4 may be an integral part of the service so that each user joining the chat session may automatically receive the presence information of the other users (via automatic subscription), e.g., as shown by a presence primitive on a line 186. In response to the invite group primitive on the line 180, as shown in FIG. 6A, the IM server provides an InviteUser primitive on a line 188 to an invited IM client (as well as other IM clients, if applicable). Each such invited IM client will respond with a JoinGroup primitive on a line 190 back to the server containing information elements as per Table 15. The authorization of the presence information is done when joining the session and not done separately (see the last IE in Table 15).

Each of the users may send a leave group message to finish the chat session with a leave group primitive message 192 (see Table 17) and the corresponding group left acknowledgement on a line 194 (see Table 18). If IM user is forced to leave the group, it receives only the group left message.

The originator may optionally request delivery report (Table 11) which is sent by the IM server when the message reaches the recipient IM client. If message is sent to multiple recipients, a delivery report is received independently for each recipient in the same way as shown in FIG. 5A.

FIG. 6B shows the instant messaging via private user group part of the IM service capabilities layer 12 of the client 20. In addition to the means providing the InviteGroup primitive, discussed above, various other means for providing the other primitives of FIG. 6A are shown as well. The invite user primitive on the line 188 is shown being received by a means 200 for receiving the InviteUser primitive and providing information elements on a line 202 corresponding to those shown in Table 13 used for a single user invitation. If the invitation is accepted, the IM services layer provides the information elements of Table 15 on a line 204 to a means 206 for providing the JoinGroup primitive on the line 190 to the IM server. An InviteInfo primitive is provided on a line 208 from the IM server to a means 210 responsive to such a primitive for providing the information elements shown in Table 14 on a line 212 to the IM services layer 10 of the client. The presence primitive on the line 186 may be provided to means 212 for providing information elements of Table 4 on a line 214 to the IM services layer of the client. In addition to sending a message on the line 182, as mentioned previously in FIG. 6A, the client may also receive a message primitive on a line 216, as shown in FIGS. 6A and 6B. The IM service capabilities layer 12, as shown in FIG. 6B, will have means 218 responsive to information elements contained in Table 10 on a line 220 for providing the message primitive on the line 182. Similarly, means 222 are provided responsive to the incoming message primitive on the line 216 for providing the information elements shown in Table 10 on a line 224 to the IM services layer 10 of the client. An UpdatePresence primitive may be provided autonomously on a line 226 from means 228 responsive to information elements such as shown in Table 2 and provided by the IM services layer on a line 230. The LeaveGroup primitive on the line 192 may be provided by a means 232 responsive to information elements such as shown in Table 17 provided on a line 234 from the IM services layer 10 of the IM client 20. The GroupLeft primitive is provided to a means 236 for providing the information elements of Table 18 on a line 238 to the IM services layer 10. Finally, a GroupChange primitive may be provided on a line 240 by the IM server to a means 242 for providing information elements corresponding to Table 16 on a line 244 to the IM services layer 10.

Figure 6C:
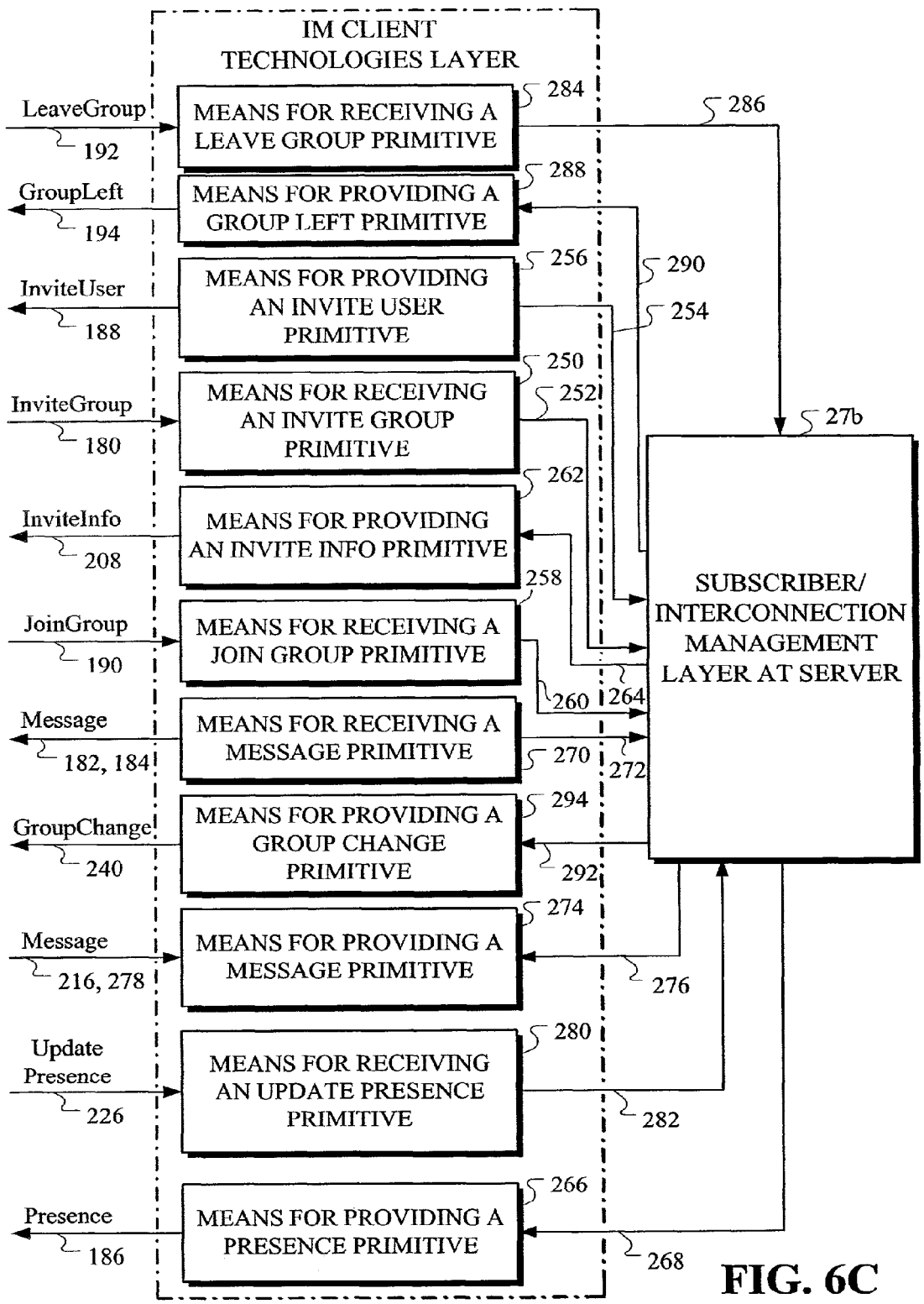
FIG. 6C shows details of a subscriber/interconnection management layer at an IM server for carrying out management of private group messaging at the IM server, according to the present invention.

The various primitives of FIG. 6B are shown in FIG. 6C on the IM server 27 side.

FIG. 6C shows the instant messaging via private user group portion of the IM client technologies layer 27a of the IM server 27 of FIG. 1B. All of the primitives shown in FIG. 6B are also shown in FIG. 6C. In response to the InviteGroup primitive on the line 180, a means 250 provides the information elements of Table 12 on a line 252 to the subscriber/interconnection management layer 27b at the server 27. The server in turn invites one or more users by providing the information elements of Table 13 on a line 254 to a means 256 for providing an InviteUser primitive on the line 188. One or more of the invited users provides back a JoinGroup primitive on the line 190 to a means 258 for receiving such JoinGroup primitives and in response thereto providing the information elements thereof according to Table 15 on a line 260 to the subscriber/interconnection management layer 27b at the server 27. The InviteInfo primitive on the line 208 is provided by means 262 in response to the information elements contained in Table 14 provided on a line 264 from the subscriber/interconnection management layer 27b at the server 27. This contains an indication of acceptance or refusal by the invited user to the inviting IM client. As mentioned in connection with FIGS. 6A and 6B, the presence primitive on the line 186 may be provided by a joining user according to the presence values the joining user would like to authorize to the group as per the last information element in the JoinGroup primitive as listed in Table 15. This presence primitive on the line 186 may be provided by means 266 for providing a presence primitive from the server in response to the information elements provided on a line 268 as listed in Table 4 and as provided by the subscriber/interconnection management layer 27b at the server 27. Messaging may then occur for instance as shown by the message primitive on the line 182 in FIG. 6A from the inviting IM client to the IM server. This is received in the server by means 270 for receiving such a message primitive and providing the information elements of Table 10 on a line 272 to the subscriber/interconnection management layer 27b at server 27. The server then relays this message to the IM client who was the invited user in FIG. 6A as shown by the message primitive on the line 216 provided by means 274 for providing such a message primitive in response to information elements provided on a line 276 having the information element content shown in Table 10 from the subscriber/interconnection management layer 27b at server 27. Likewise, the invited IM client of FIG. 6A can send a message on a line 184 to the IM server. This message primitive is provided to the means 270 for receiving such a message primitive and the information elements according to Table 10 are then provided on the line 272 to the subscriber/interconnection management layer 27b at the server 27 and relayed back on the line 276 to the means 274 for providing such a message primitive and thence on a line 278 to the inviting client.

Regarding the updating of presence by an IM client, such a primitive is shown on the line 226 being received by means 280 for receiving an update presence primitive and providing the information elements as listed in Table 2 on a line 282 to the subscriber/interconnection management layer 27b at server 27. This updated presence is then available to members of the private user group.

The LeaveGroup primitive on the line 192 is provided to means 284 for receiving a LeaveGroup primitive and providing the information elements listed in Table 17 on a line 286 to the subscriber/interconnection management layer 27b at server 27. A GroupLeft primitive on the line 194 is then provided by means 288 in response to information elements provided on a line 290 according to Table 18 from the subscriber/interconnection management layer 27b at the server 27. Finally, the subscriber/interconnection management layer 27b at server 27 may provide the information elements of Table 16 on a line 292 to a means 294 for providing the group change primitive on the line 240 as shown in FIGS. 6B and 6A to provide a list of recently joined/left IM users.

3. Messaging Via a Public User Group

Figure 7A:
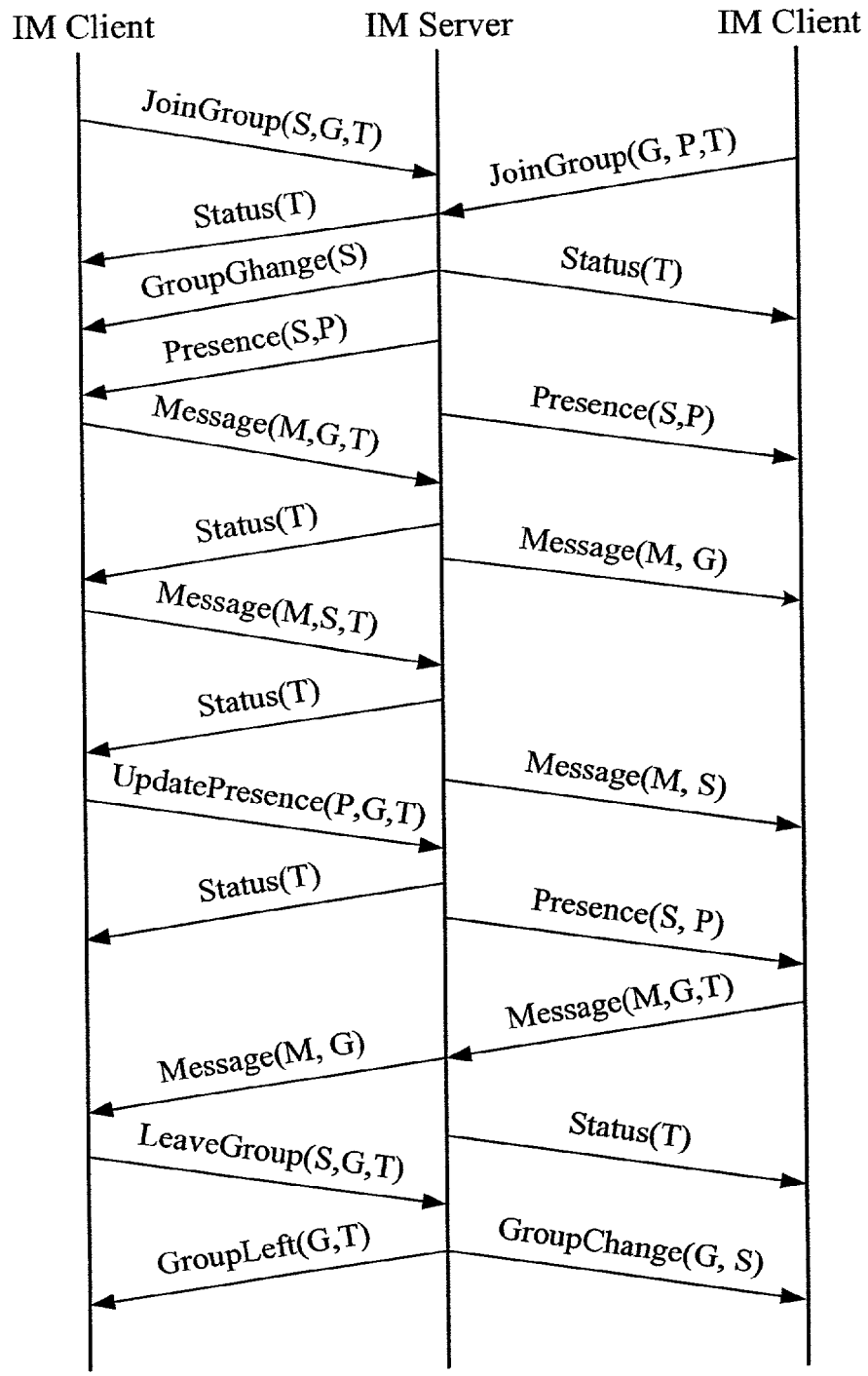
FIG. 7A is a session diagram showing instant messaging via public user group, according to the present invention.
Figure 7B:
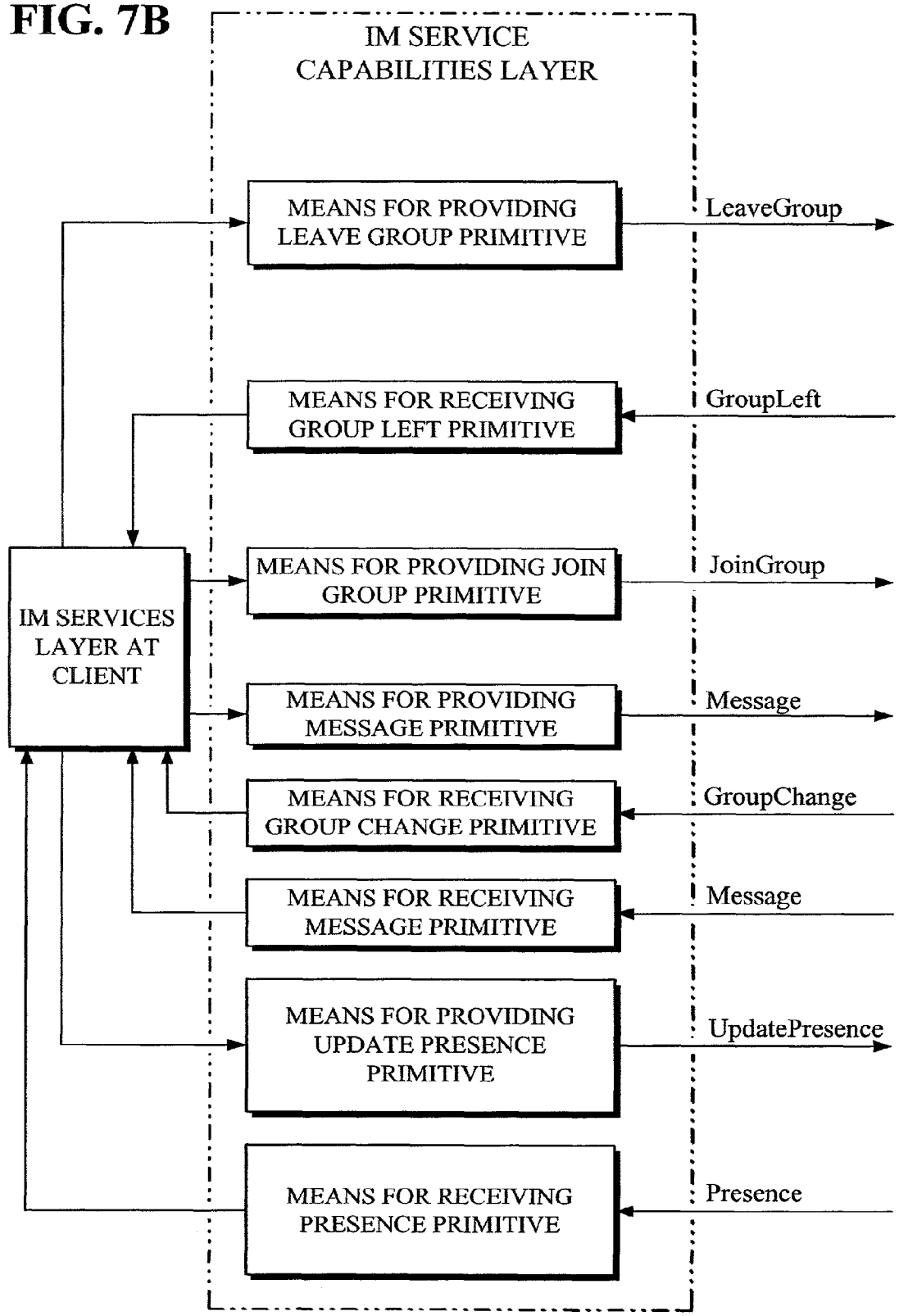
FIG. 7B shows details of an IM service capabilities layer at an IM client for carrying out public group messaging at the IM client, according to the present invention.
Figure 7C:
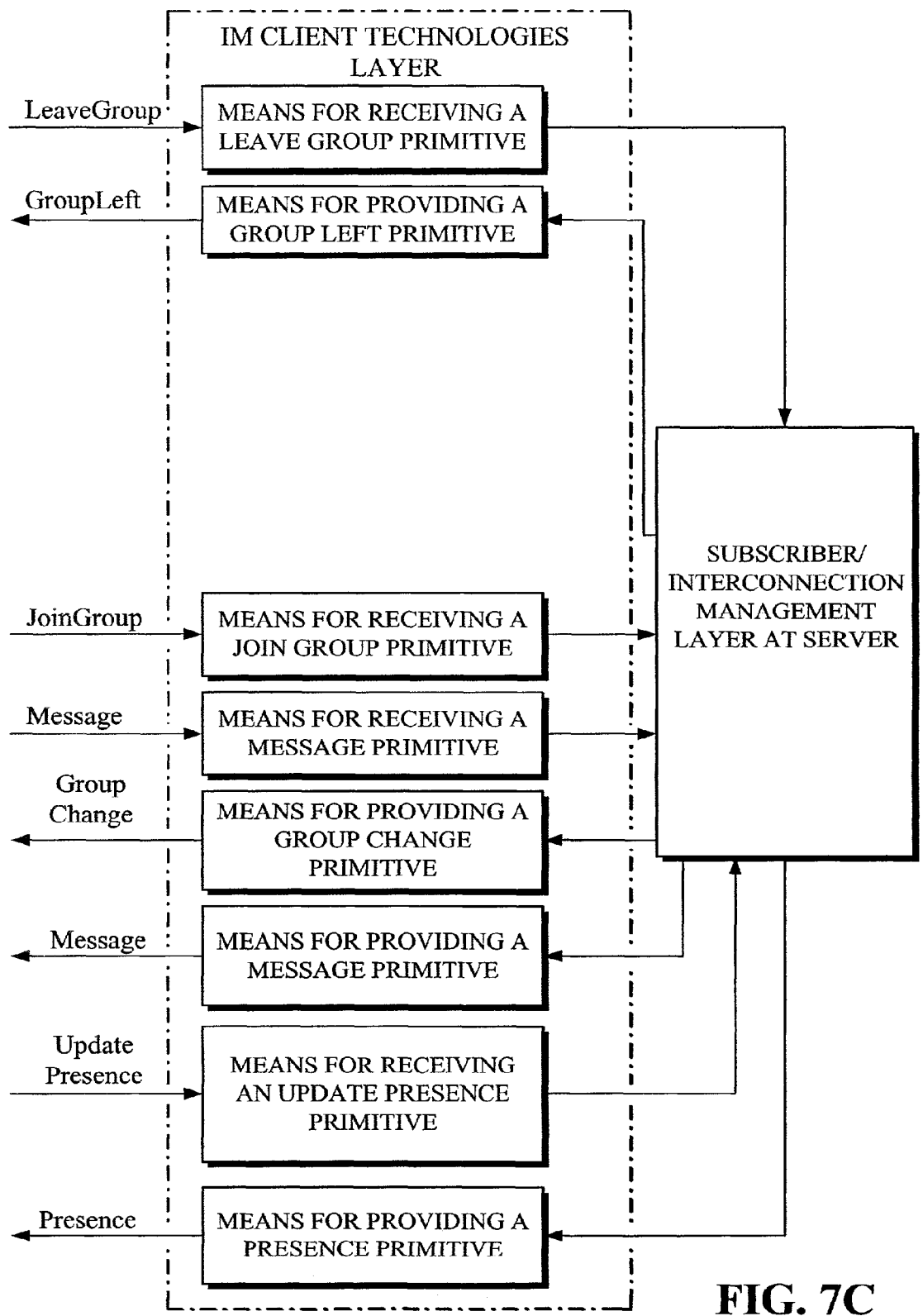
FIG. 7C shows details of a subscriber/interconnection management layer at an IM server for carrying out public group messaging at the IM server, according to the present invention.

Messaging via a public user group is presented in FIGS. 7A, 7B and 7C. The basic difference between public and private user group is that the IM service provider manages the user group and all IM users join to the group instead of inviting other IM users to the group. The public user groups are often created under some particular topic (chat rooms).

The messaging and presence parts of the public user group works similarly than with private user group.

The IM service provider may maintain a set of different user groups for various discussion topics.

Also, due to their self-explanatory nature in light of the private user group discussion above, a detailed description of FIGS. 7A, 7B and 7C is omitted and it will be realized that the main difference between messaging via public user group and private user group is the fact that the InviteUser, InviteGroup, and InviteInfo primitives are absent because of the fact that the public user group is created and managed by the IM service provider.

4. Primitives and Information Elements

TABLE 9

Primitives for messaging via user group

| Primitive | Direction |
|---|---|
| Message | IM Client ↔ IM Server |
| Delivery | IM Server → IM Client |
| InviteGroup | IM Client ↔ IM Server |
| JoinGroup | IM Client → IM Server |
| LeaveGroup | IM Client → IM Server |
| GroupLeft | IM Server → IM Client |

TABLE 10

Message

| Information Element | Req | Description |
|---|---|---|
| Message-Type | Mandatory | Message identifier |
| Version | Mandatory | Version of the IM specification |
| Own-Client-ID | Mandatory | The identification of the sending IM client. |
| Own-User-ID | Mandatory | The subscriber identification of the sending IM user |
| Req-Client-ID | Conditional | The identification of the recipient IM client, if message is targeted to single IM client only. |
| Req-User-ID | Conditional | The subscriber identification of the recipient IM user if individual messaging is requested |
| Group-ID | Conditional | Identifies the group if messaging is requested via buddy list |
| Join-ID | Conditional | Dynamic identification of the join session. Present if messaging is requested via public or private user group. |
| Content-Type | Mandatory | The content type of the instant message |
| Content | Optional | The content of the instant message |

TABLE 11

Delivery

| Information Element | Req | Description |
|---|---|---|
| Message-Type | Mandatory | Message identifier |
| Version | Mandatory | Version of the IM specification |
| Req-User-ID | Mandatory | The subscriber identification of the recipient IM user if individual messaging is requested |
| Message-ID | Mandatory | Identifies the message the report is referring to. |
| Group-ID | Optional | Identifies the group if messaging is requested via group |
| Delivery-Status | Mandatory | Identifies the status of the delivery |

TABLE 12

InviteGroup

| Information Element | Req | Description |
|---|---|---|
| Message-Type | Mandatory | Message identifier |
| Version | Mandatory | Version of the IM specification |

TABLE 12-continued

InviteGroup

| Information Element | Req | Description |
|---|---|---|
| Transaction-ID | Mandatory | Identification of the invite transaction |
| Own-Client-ID | Mandatory | Identification of the inviting IM client |
| Own-User-ID | Mandatory | The subscriber identification of the inviting IM user |
| Inv-User-List | Mandatory | A list of IM users invited to the group |
| Group-ID | Mandatory | Identification of the group the IM user is invited to |

TABLE 13

InviteUser

| Information Element | Req | Description |
|---|---|---|
| Message-Type | Mandatory | Message identifier |
| Version | Mandatory | Version of the IM specification |
| Transaction-ID | Mandatory | Identification of the invite transaction |
| Own-Client-ID | Mandatory | Identification of the inviting IM client |
| Own-User-ID | Mandatory | The subscriber identification of the inviting IM user |
| Req-Client-ID | Mandatory | Identification of the invited IM client |
| Req-User-ID | Mandatory | Identification of the invited IM user |
| Group-ID | Mandatory | Identification of the group the IM user is invited to |

TABLE 14

InviteInfo

| Information Element | Req | Description |
|---|---|---|
| Message-Type | Mandatory | Message identifier |
| Version | Mandatory | Version of the IM specification |
| Own-Client-ID | Mandatory | Identification of the inviting IM client |
| Own-User-ID | Mandatory | Identification of the inviting IM user |
| Req-User-ID | Mandatory | Identification of the invited IM user |
| Inv-User-ID | Mandatory | A list of IM users invited to the group |
| Group-ID | Mandatory | Identification of the group of the IM user is invited to |
| Join-Acceptance | Mandatory | Indicates if the IM users approves the invitation or not |
| Reject-Reason | Optional | A textual comment indicating why join was not possible. |

TABLE 15

JoinGroup

| Information Element | Req | Description |
|---|---|---|
| Message-Type | Mandatory | Message identifier |
| Version | Mandatory | Version of the IM specification |
| Transaction-ID | Mandatory | Identification of the invite transaction |
| Group-ID | Mandatory | Identifies the group the IM user is invited to |
| Join-Acceptance | Mandatory | Indicates if the IM user approves the invitation or not |

TABLE 15-continued

JoinGroup

| Information Element | Req | Description |
|---|---|---|
| Reject-Reason | Optional | A textual comment indicating why join was not possible. |
| Join-Properties | Mandatory | The properties for the group, such as nickname, blocked IM users |
| Presence-Value-List | Optional | The presence values the IM user would like to authorise to the group. |

TABLE 16

GroupChange

| Information Element | Req | Description |
|---|---|---|
| Message-Type | Mandatory | Message identifier |
| Version | Mandatory | Version of the IM specification |
| Transaction-ID | Mandatory | Identifies the invite or modify join transaction |
| Group-ID | Mandatory | Identifies the IM group |
| Joined-User-List | Optional | A list of recently joined IM users |
| Left-User-List | Optional | A list of recently left IM users |

TABLE 17

LeaveGroup

| Information Element | Req | Description |
|---|---|---|
| Message-Type | Mandatory | Message identifier |
| Version | Mandatory | Version of the IM specification |
| Transaction-ID | Mandatory | Identifies the leave transaction |
| Own-Client-ID | Mandatory | The own identification of the IM client |
| Own-User-ID | Mandatory | The own identification of the IM user |
| Group-ID | Mandatory | The identification of the group being left |
| Join-ID | Mandatory | Dynamic identification of the join session. |

TABLE 18

GroupLeft

| Information Element | Req | Description |
|---|---|---|
| Message-Type | Mandatory | Message identifier |
| Version | Mandatory | Version of the IM specification |
| Transaction-ID | Optional | Identifies the possible leave transaction |
| Own-Client-ID | Mandatory | The client identification left from group |
| Own-User-ID | Mandatory | The user identification left from group |
| Group-ID | Mandatory | The group being left |
| Join-ID | Mandatory | Dynamic identification of the terminated join session. |
| Left-Reason | Mandatory | The reason the group is left (own request, kicked off, etc.) |

Subscriber and User Group Functions

1. Management of IM User Profile

The definition or management of IM User profiles from the client side is outside the scope of the present invention. WAP browsing or any other applicable browsing technology, such as HTML would be quite valid and acceptable approaches.

2. Management of User Groups

The IM user may manage private user groups and buddy lists in the IM server.

Figure 8A:
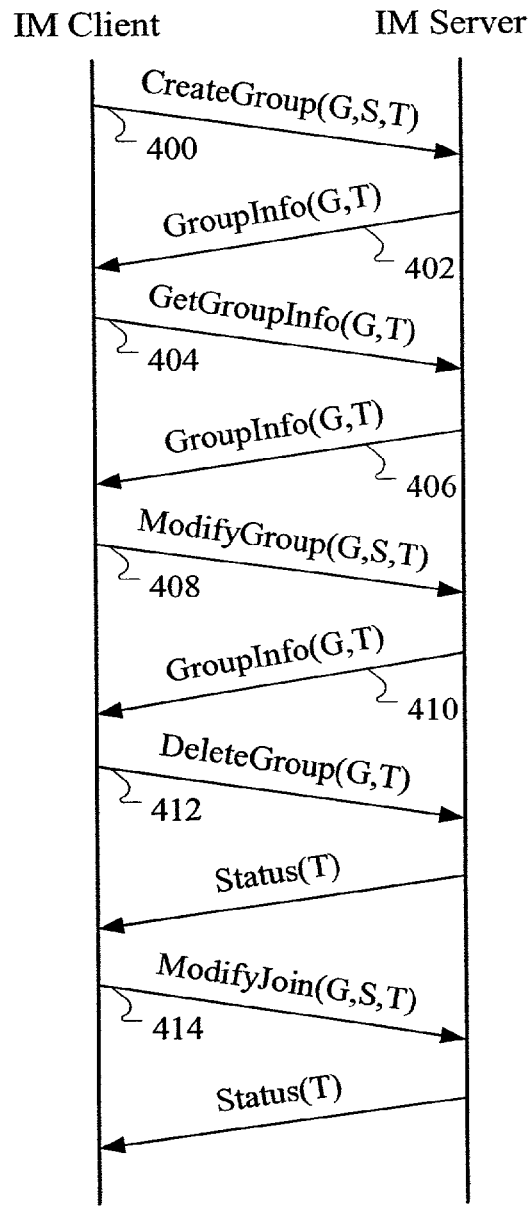
FIG. 8A is a session diagram showing management of user groups and buddy lists, according to the present invention.

A private user group or buddy list is created using a CreateGroup message 400 as shown in FIG. 8A. The message contains information about the requested properties of the group as well as initial IM users belonging to the group (see the Information Elements listed in Table 20). The IM server will reply with a GroupInfo message 402 indicating the accepted properties of the group (see Table 21).

The IM user may request group or buddy list info with a GetGroupInfo message 404 (see Table 22). The group info request may be limited to the owner of the group or buddy list. In response, a group information primitive (GroupInfo) is provided on a line 406 (see Table 21) by the IM Server.

The IM user owning the user group or buddy list may change its properties, add and delete new IM users in the group, etc. using a Modify Group primitive on a line 408 (see Table 23). A GroupInfo message back 410 acknowledges the request (see Table 21).

The owner of the private group or buddy list may send DeleteGroup message 412 to permanently remove the user group or buddy list (see Table 24).

Finally, a ModifyJoin primitive may be provided by an IM client on a line 414 (see Table 25).

Figure 8B:
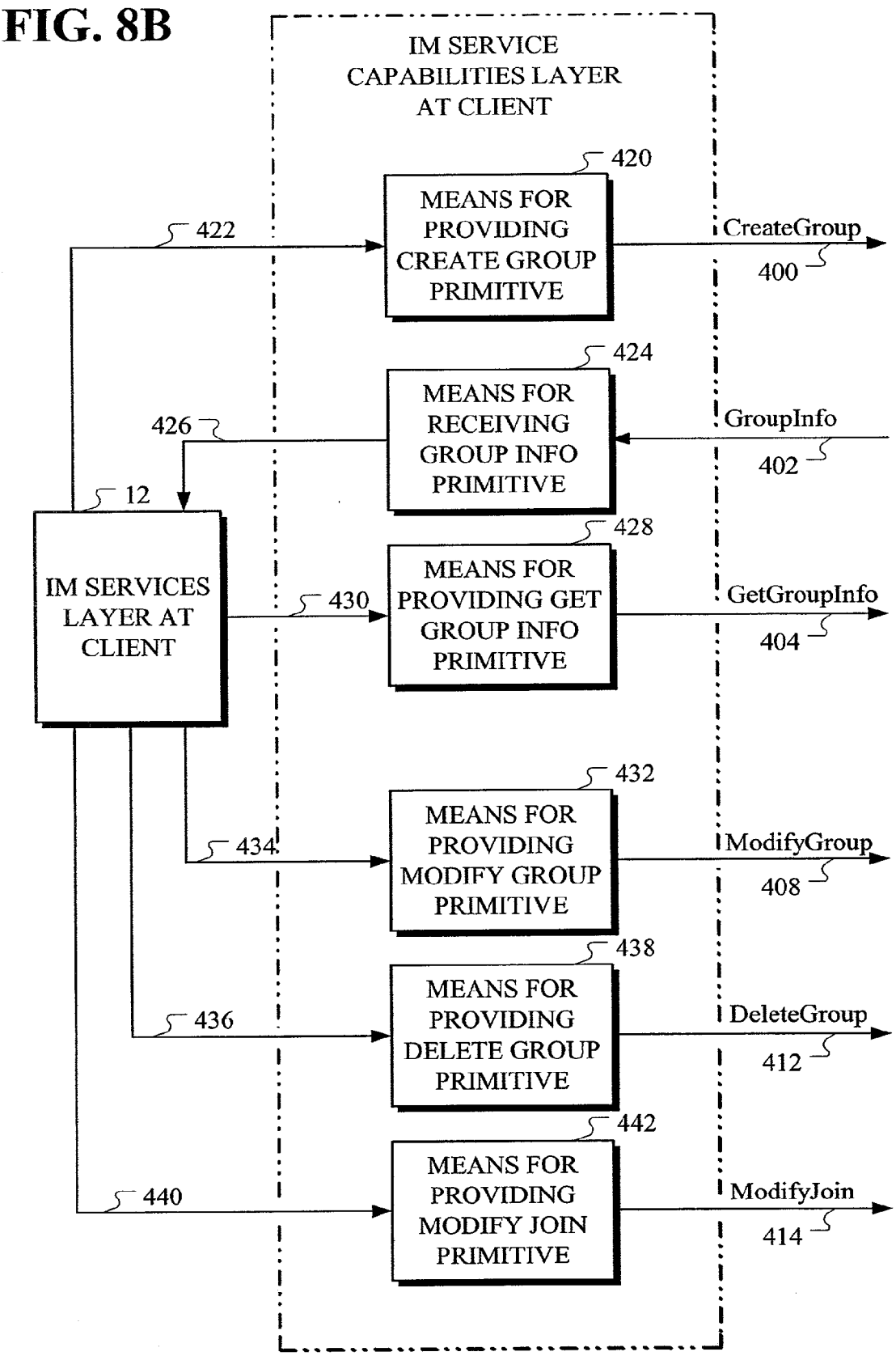
FIG. 8B shows details of an IM service capabilities layer at an IM client for carrying out a user group management service at the IM client, according to the present invention.

Referring now to FIG. 8B, the CreateGroup primitive on the line 400 of FIG. 8A is also shown in FIG. 8B being provided by a means 420 for providing the CreateGroup primitive in response to information elements as per Table 20 provided on a line 422 from the user group management portion of the IM services layer 12 at the IM client 20. Similarly, the GroupInfo primitive on the line 402 of FIG. 8A is also shown in FIG. 8B being provided to a means 424 for receiving the GroupInfo primitive and, in response thereto, providing information elements as per Table 21 to the IM services layer 12.

The GetGroupInfo primitive on the line 404 is provided by means 428 for providing same in response to information elements according to Table 22 on a line 430 from the IM services layer 12.

The ModifyGroup primitive on the line 408 of FIG. 8A is shown also in FIG. 8B as provided by a means 432 for providing same in response to information elements according to Table 23 on a line 434 from the user group management portion of the IM services layer 12 at the client 20. This layer also provides information elements according to Table 24 on a line 436 to means 438 for providing the DeleteGroup primitive on the line 412. Likewise, the user group management portion of the IM services layer 12 at the IM client 20 provides information elements according to Table 25 on a line 440 to means 442 for providing the ModifyJoin primitive on the line 414.

Figure 8C:
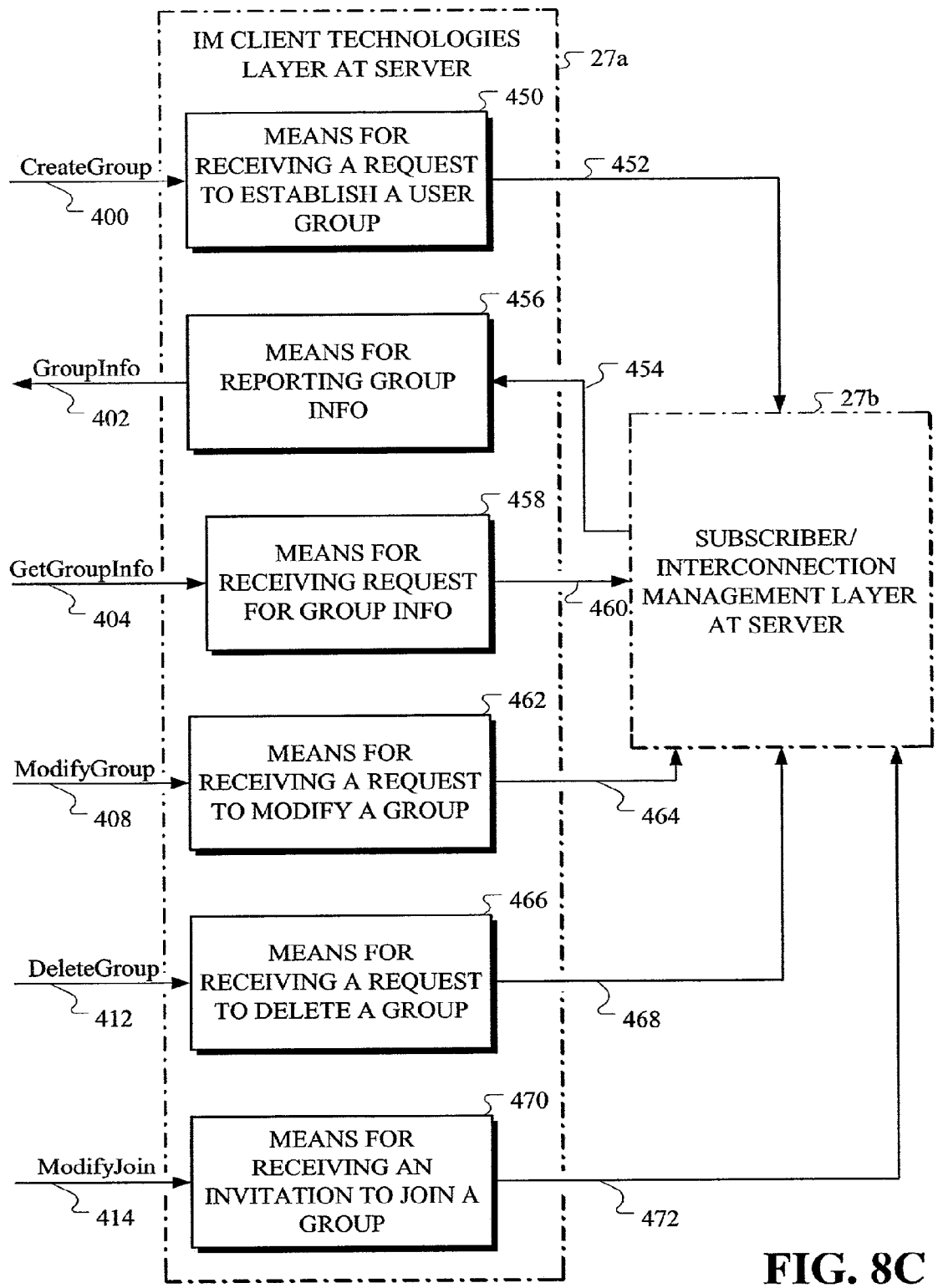
FIG. 8C shows details of a subscriber/interconnection management layer at an IM server for carrying out maintenance of user groups at the IM server, according to the present invention.

Referring now to FIG. 8C, the CreateGroup primitive provided by an IM client as shown in FIG. 8A is received by the IM server at the IM client technologies layer 27a by means 450 for providing information elements according to Table 20 on a line 452 to the subscriber/interconnection management layer 27b at the IM server 27 on FIG. 1B. This layer provides information elements according to Table 21 on a line 454 to means 456 for reporting group info with the GroupInfo primitive on the line 402.

The GetGroupInfo primitive on the line 404 is provided to means 458 for receiving a request for group information and providing the information elements of Table 22 on a line 460 to the subscriber/interconnection management layer 27b at the IM server 27.

Means 462 are also provided at the IM client technologies layer 27a of the IM server 27 for receiving a ModifyGroup primitive on a line 408 for providing information elements on a line 464 according to Table 23. A DeleteGroup primitive on the line 412 is provided to means 466 for receiving a request to delete a group and, in response thereto, providing information elements according to Table 24 on a line 468 to the subscriber/interconnection management layer 27b at server 27.

Finally, means 470 is responsive to the ModifyJoin primitive on the line 414 comprising an invitation to join a group, for providing information elements according to Table 23 on a line 472 to the subscriber/interconnection management layer 27b at server 27.

The management of public user groups is out of the scope of this invention.

3. Searching User Groups

Figure 9A:
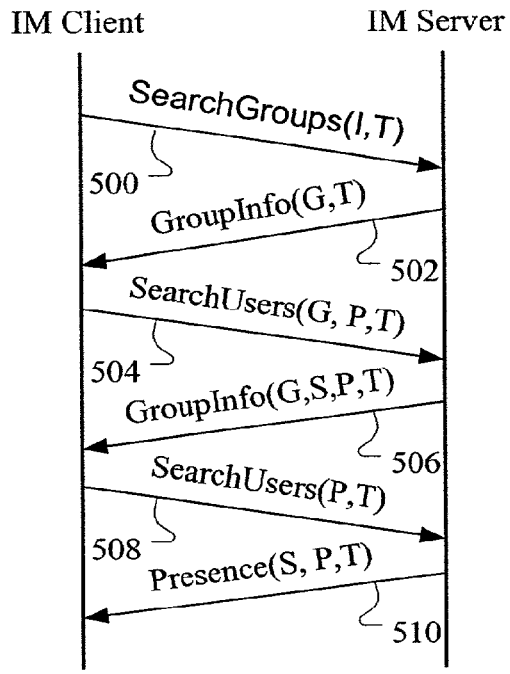
FIG. 9A is a session diagram showing searching users and groups, according to the present invention.

An IM user may search user groups based on various information, such as topic of the group, IM users of the group, etc., using a SearchGroup primitive (I=error info) as shown in FIG. 9A on a line 500 (see Table 26). The search is mainly limited to public user groups. The IM server replies with the GroupInfo message on a line 502 indicating the groups that match the search criteria (see Table 21).

An IM user may also search for groups that contain IM users having certain presence capabilities using a SearchUsers primitive on a line 504 (see Table 27). In this case, the IM server replies with a GroupInfo message on a line 506 indicating the groups that match the search criteria. The IM user may also search directly the IM users having certain presence properties using the SearchUsers primitive on a line 508 even if they are not joined to any group. In this case, the IM server replies with presence information of the IM users matching the search criteria as shown by a return by the IM server of a Presence primitive on a line 510 to the IM client.

The IM user may limit its presence and group information not to be used in search requests for privacy reasons.

Figure 9B:
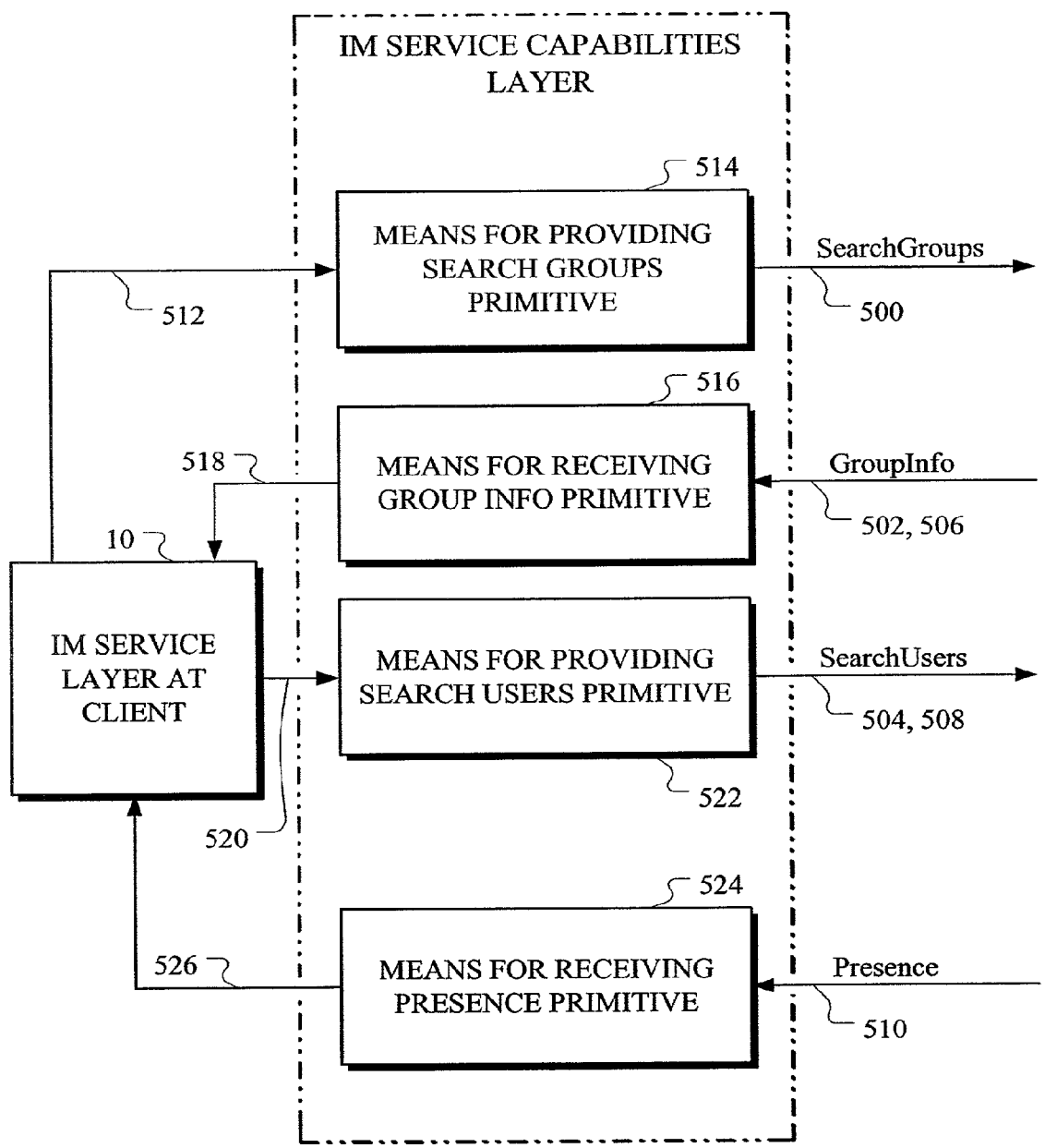
FIG. 9B shows details of an IM service capabilities layer at an IM client for carrying out a search user and group service at the IM client, according to the present invention.

Referring now to FIG. 9B, the IM service capabilities layer of the IM client 20 is shown in part for carrying out the searching functions of FIG. 9A in conjunction with the IM services layer 10 of FIG. 1B. This IM service layer 10 can provide information elements according to Table 26 on a line 512 to a means 514 for providing the SearchGroups primitive on the line 500. The GroupInfo primitive on the line 502 or on the line 506 of FIG. 9A is provided from the IM server to a means 516 for receiving the GroupInfo primitive and providing the information elements of Table 21 on a line 518 to the IM services layer 10 at the client 20. The IM services layer 10 can also provide information elements corresponding to those in Table 27 on a line 520 to means 522 for providing the SearchUsers primitive on the line 504 or on the line 508. The Presence primitive on the line 512 of FIG. 9A is provided to a means 524 for providing information elements corresponding to those in Table 4 on a line 526 to the IM services layer 10.

Figure 9C:
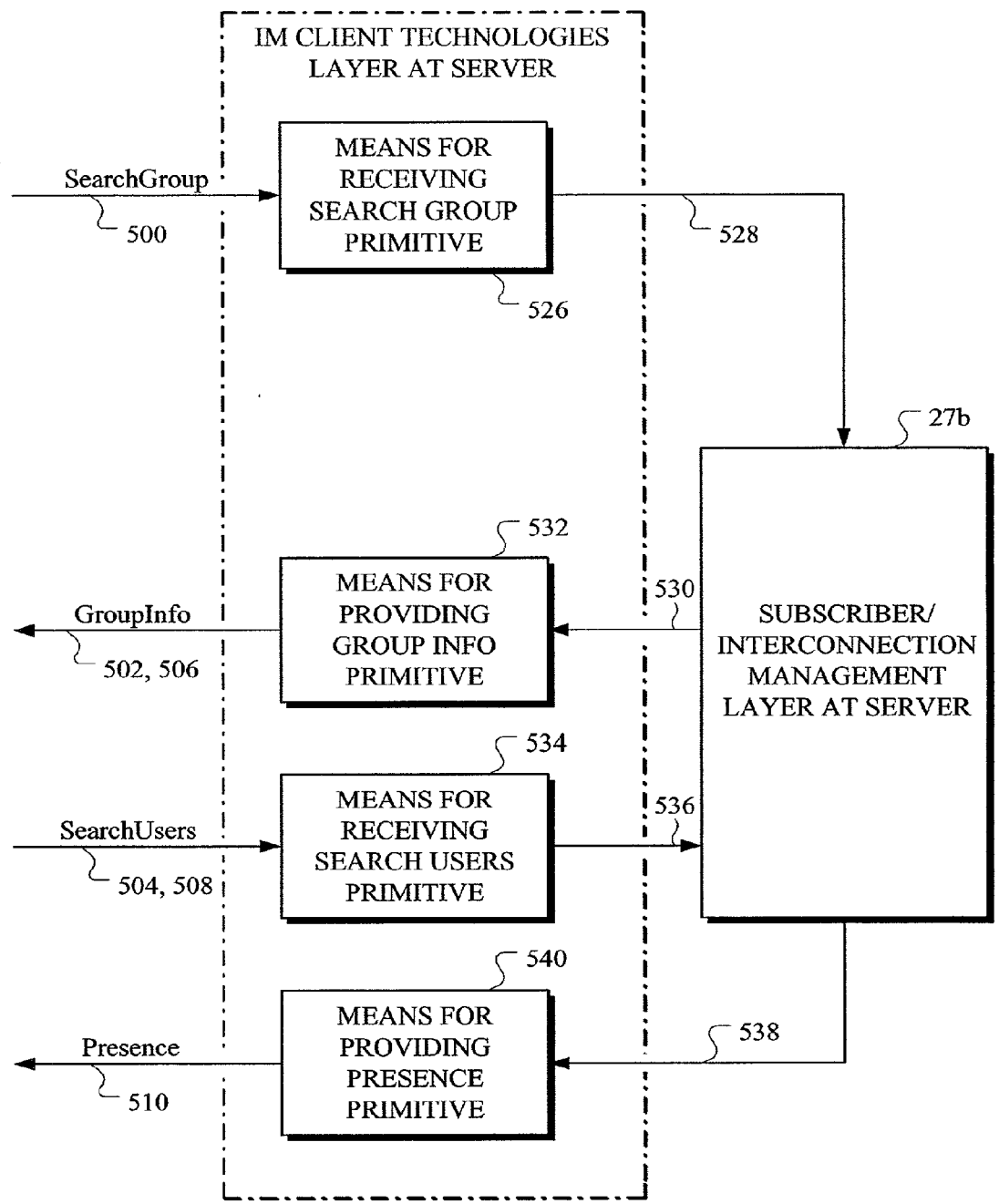
FIG. 9C shows details of a subscriber/interconnection management layer at an IM server for carrying out a search user and group service at the IM server, according to the present invention.

Referring now to FIG. 9C, the SearchGroup primitive on the line 500 is provided to means 526 for receiving the SearchGroup primitive and providing information elements corresponding to those in Table 26 on a line 528 to the subscriber/interconnection management layer 27b of the IM server 27. This layer 27b provides information elements corresponding to those in Table 21 on a line 530 to a means 532 for providing the GroupInfo primitive on the line 502 or the line 506.

As mentioned in connection with FIG. 9A, a SearchUsers primitive may be provided on a line 504 or on a line 508 to means 534 for receiving a SearchUser primitive and providing information elements according to Table 26 on a line 536 to the subscriber/interconnection management layer 27b at server 27. In response, the layer 27b may provide a GroupInfo primitive as described before or presence information elements as shown in Table 4 for instance and as provided on a line 538 to means 540 for providing the presence primitive on the line 510.

TABLE 19

Primitives for User Group Management

| Primitive | Direction |
| --- | --- |
| CreateGroup | IM Client → IM Server |
| GetGroupInfo | IM Client → IM Server |
| GroupInfo | IM Server → IM Client |
| ModifyGroup | IM Client → IM Server |
| ModifyJoin | IM Client → IM Server |
| DeleteGroup | IM Client → IM Server |
| SearchGroups | IM Client → IM Server |
| SearchUsers | IM Client → IM Server |

TABLE 20

CreateGroup

| Information Element | Req | Description |
| --- | --- | --- |
| Message-Type | Mandatory | Message identifier |
| Version | Mandatory | Version of the IM specification |
| Transaction-ID | Mandatory | Transaction identifier of the create group transaction |
| Own-Client-ID | Mandatory | The identification of the IM client. |
| Own-User-ID | Mandatory | The identification of the creator of the group |
| Group-Properties | Optional | The requested properties of the group |
| All-Users-List | Optional | A list of initial IM users being member of the group |

TABLE 21

GroupInfo

| Information Element | Req | Description |
| --- | --- | --- |
| Message-Type | Mandatory | Message identifier |
| Version | Mandatory | Version of the IM specification |
| Transaction-ID | Mandatory | Identifies the invite or get info transaction |
| Group-ID | Mandatory | Identifies the IM group |
| Group-Properties | Optional | A list of group properties |
| Joined-User-List | Optional | A list of all joined IM users |
| All-User-List | Optional | A list of all IM users being member of the group |

TABLE 22

GetGroupInfo

| Information Element | Req | Description |
| --- | --- | --- |
| Message-Type | Mandatory | Message identifier |
| Version | Mandatory | Version of the IM specification |

TABLE 22-continued

GetGroupInfo

| Information Element | Req | Description |
| --- | --- | --- |
| Transaction-ID | Mandatory | Transaction identifier of the get info transaction |
| Own-Client-ID | Mandatory | The identification of the requesting IM client |
| Own-User-ID | Mandatory | The identification of the requesting IM user |
| Group-ID | Mandatory | The identifier of the group |

TABLE 23

ModifyGroup

| Information Element | Req | Description |
| --- | --- | --- |
| Message-Type | Mandatory | Message identifier |
| Version | Mandatory | Version of the IM specification |
| Transaction-ID | Mandatory | Transaction identifier of the modify group transaction |
| Own-Client-ID | Mandatory | Identification of the requesting IM client |
| Own-User-ID | Mandatory | Identification of the requesting IM user |
| Group-ID | Mandatory | Identification of the group |
| Group-Properties | Optional | The requested properties of the group. |
| New-Users-List | Optional | A list of IM users to be added to the user group |
| Delete-Users-List | Optional | A list of IM users to be deleted from the user group |

TABLE 24

DeleteGroup

| Information Element | Req | Description |
| --- | --- | --- |
| Message-Type | Mandatory | Message identifier |
| Version | Mandatory | Version of the IM specification |
| Transaction-ID | Mandatory | Transaction identifier of the delete group transaction |
| Own-Client-ID | Mandatory | Identification of the requesting IM client |
| Own-User-ID | Mandatory | Identification of the requesting IM user |
| Group-ID | Mandatory | Identification of the group to be deleted |

TABLE 25

ModifyJoin

| Information Element | Req | Description |
| --- | --- | --- |
| Message-Type | Mandatory | Message identifier |
| Version | Mandatory | Version of the IM specification |
| Transaction-ID | Mandatory | Identification of the modify transaction |
| Own-Client-ID | Mandatory | Identification of the IM client |
| Own-User-ID | Mandatory | Identification of the IM user |
| Group-ID | Mandatory | Identifies the user group |
| Join-ID | Mandatory | Dynamic identification of the join session |
| Join-Properties | Mandatory | The properties for the group, such as nickname, blocked IM users, etc. |

TABLE 26

SearchGroups

| Information Element | Req | Description |
| --- | --- | --- |
| Message-Type | Mandatory | Message identifier |
| Version | Mandatory | Version of the IM specification |
| Transaction-ID | Mandatory | Identifies the search transaction |
| Own-Client-ID | Mandatory | Identifies the requesting IM client |
| Own-User-ID | Mandatory | Identification of the requesting IM user |
| Group-Properties | Mandatory | Searching criteria in terms of group properties |

TABLE 27

SearchUsers

| Information Element | Req | Description |
| --- | --- | --- |
| Message-Type | Mandatory | Message identifier |
| Version | Mandatory | Version of the IM specification |
| Transaction-ID | Mandatory | Identifies the search transaction |
| Own-Client-ID | Mandatory | Identification of the requesting IM client |
| Own-User-ID | Mandatory | Identification of the requesting IM user |
| SearchUserList | Mandatory | A list of IM users to be searched |

Shared Content Management

Figure 10A:
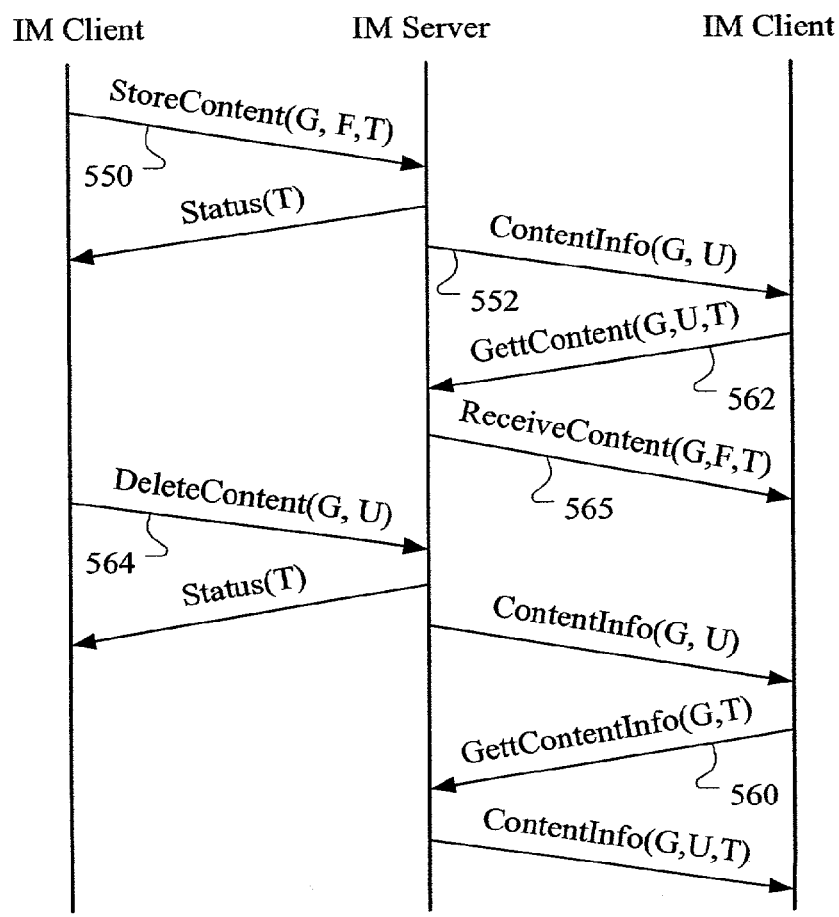
FIG. 10A is a session diagram showing management of shared content, according to the present invention.

As shown in FIG. 10A, an IM user is able to store arbitrary content to the IM server by sending the content within a StoreContent message primitive on a line 550. The content storage is done in the scope of a user group. The IM server sends a ContentInfo message (U=header info) on a line 552 to all IM users in the group to indicate new stored content, or just to the sender (Status) indicating that content could not be stored. The IM user may define limited access rights to the content.

An alternative way to handle shared content in the server is that content info of a new content is not sent every time, but the IM users may request the information of all stored content with a GetContentInfo message on a line 560.

A store request to an existing content will replace the existing content with new ContentInfo messages.

Based on defined access rights, the IM users may send a GetContent message on a line 562 to retrieve the content and send DeleteContent message on a line 564 to permanently remove the content. In response to the GetContent primitive on the line 562, the IM server provides the content, if appropriate, in a ReceiveContent primitive on a line 565.

Figure 10B:
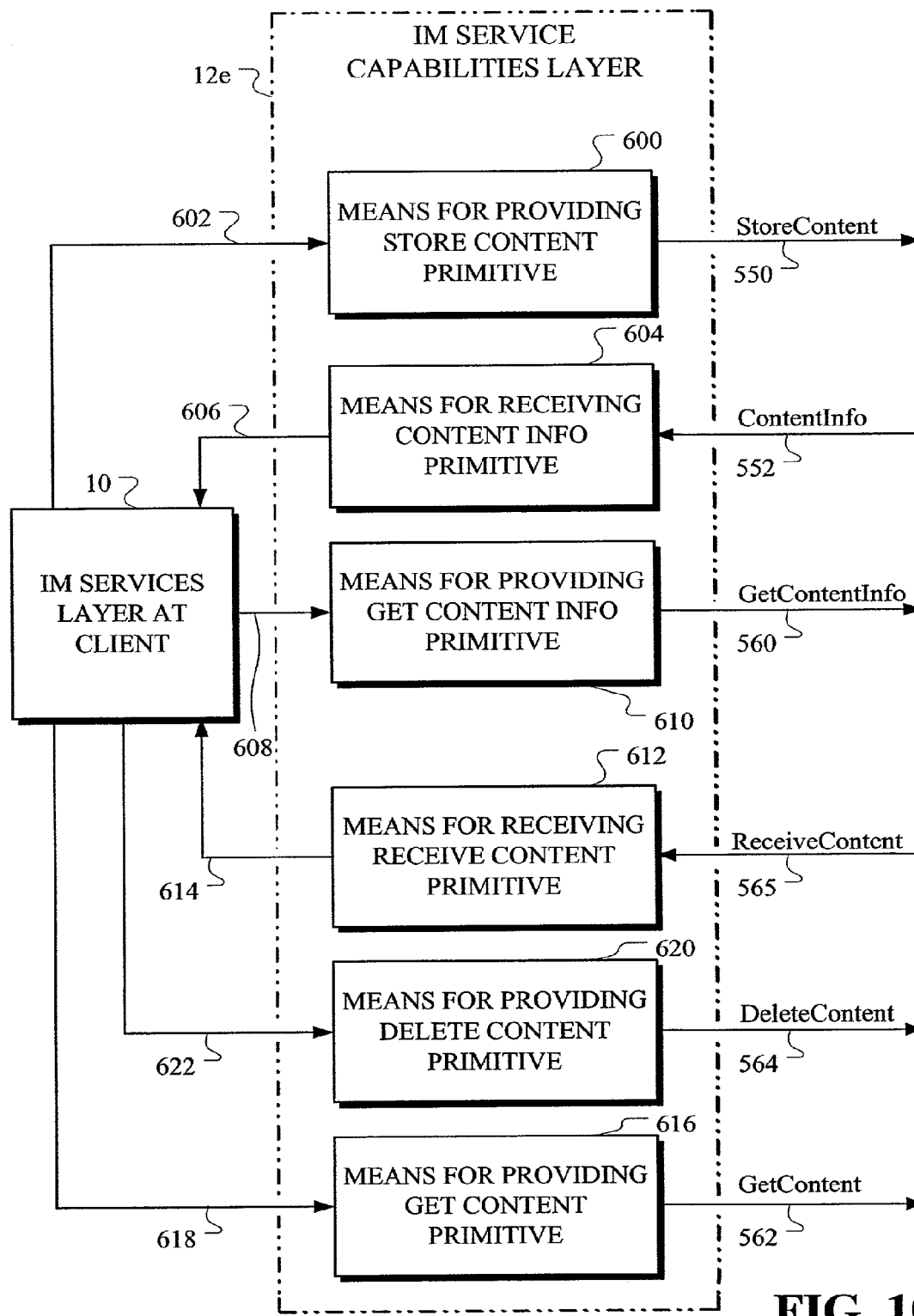
FIG. 10B shows details of an IM service capabilities layer at an IM client for carrying out a shared content management service at the IM client, according to the present invention.

Referring now to FIG. 10B, the shared content management portion of the user group management part 12e of the IM service capabilities layer 12 of the IM client 20 of FIG. 1B is shown in conjunction with the IM services layer 10 for interfacing with the IM session layer 14 and from there via the IM transport layer 16 over the connection 29 to the IM server 27 of FIG. 1B. The StoreContent primitive 550 of FIG. 10A is shown in FIG. 10B being provided by a means 600 that provides same in response to information elements according to Table 29 provided on a line 602 from the IM services layer 10. The content management portion of the user group management part of the IM service capabilities layer 12e also has means 604 responsive to the ContentInfo primitive on the line 552 for providing information elements according to Table 31 on a line 606 to the IM services layer 10. A client is also able, by means of the IM services layer 10 to provide information elements on a line 608 corresponding to those listed in Table 33 to a means 610 for providing the GetContentInfo primitive on the line 560. The ReceiveContent primitive on the line 565 is provided to a means 612 for receiving same and providing information elements on a line 614 corresponding to those listed in Table 30. This would not only be received in response to a GetContent primitive provided on the line 562 from means 616 that in turn has received information elements on a line 618 from the IM services layer corresponding to those listed in Table 32.

Finally, a client is able to delete content by means of the primitive on the line 564 by means 620 for providing same in response to information elements provided on a line 622 corresponding to those listed in Table 34.

Figure 10C:
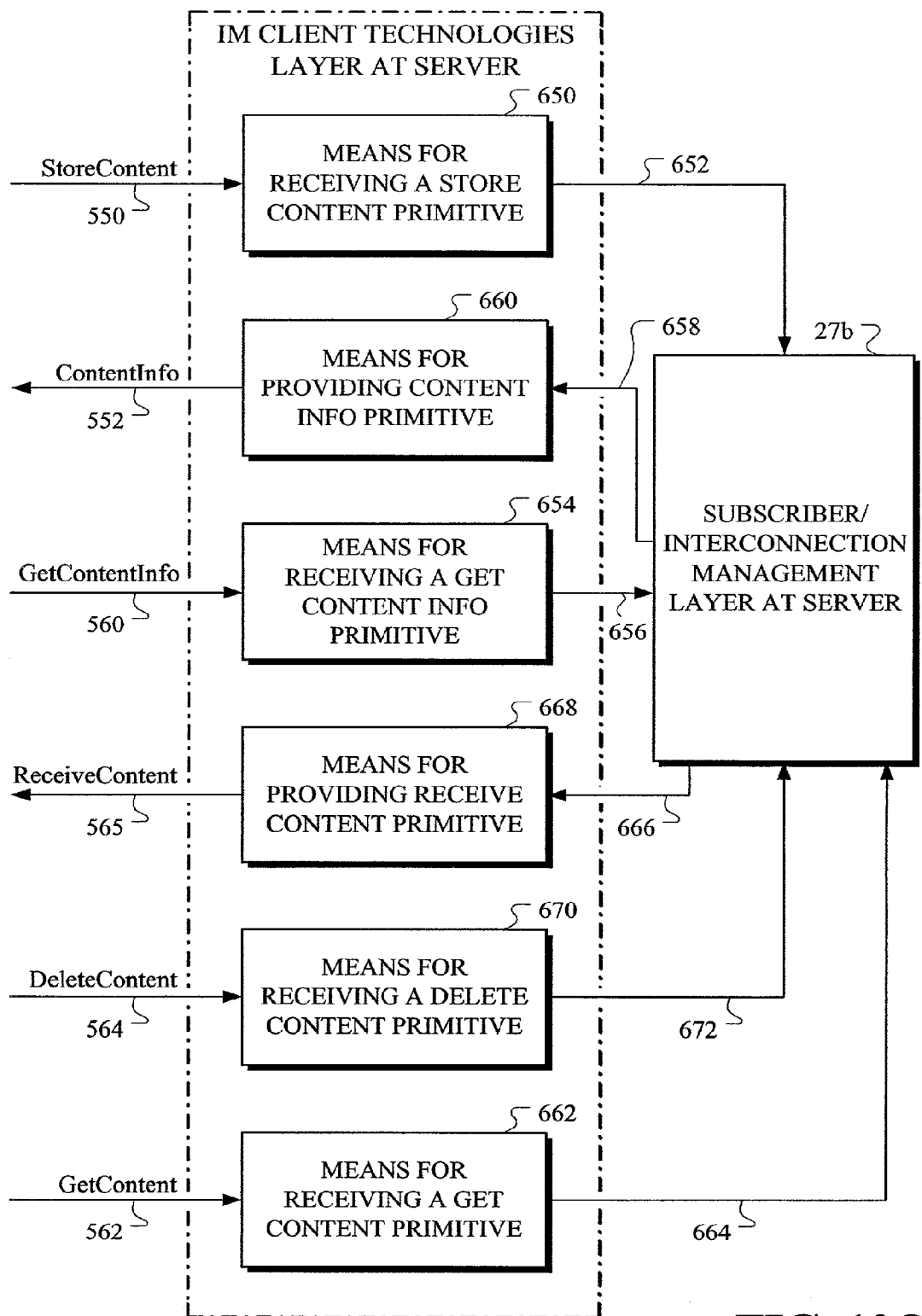
FIG. 10C shows details of a subscriber/interconnection management layer at an IM server for carrying out shared content management at the IM server, according to the present invention.

Turning now to FIG. 10C, a part of the IM technologies layer 27a at the IM server 27 relating to content management is shown in conjunction with the subscriber/interconnection management layer 27b for interfacing with the lower layers of the IM server 27 with the primitives shown in FIGS. 10A and 10B.

A means 650 is shown responsive to the StoreContent primitive on the line 550 for receiving same and providing information elements on a line 652 corresponding to the information elements listed in Table 29 to the subscriber/interconnection management layer 27b.

Means 654 are included so as to be responsive to the GetContentInfo primitive on the line 560 for receiving same and providing information elements on a line 656 indicative of the information elements listed in Table 33. In response, the subscriber/interconnection management layer 27b at the server 27 can provide information elements on a line 658 corresponding to those listed in Table 31 to means 660 for providing the ContentInfo primitive on the line 552.

The GetContent primitive on the line 562 is provided to a means 662 for receiving same and providing information elements corresponding to those listed in Table 32 on a line 664 to the subscriber/interconnection management layer 27b. Content is then provided in the form of information elements listed in Table 30 for instance, if appropriate, on a line 666 to a means 668 for providing the ReceiveContent primitive on the line 565.

Finally, the DeleteContent primitive on the line 564 is provided to means 670 for receiving same and providing information elements such as listed in Table 34 on a line 672 to the subscriber/interconnection management layer 27b at server 27 which then takes the appropriate steps to delete the content indicated by the last item of Table 34.

Primitives and Information Elements for Shared Content Management

TABLE 28

Shared Content Management Primitives

| Primitive | Direction |
|---|---|
| StoreContent | IM Client → IM Server |
| ContentInfo | IM Server → IM Client |
| GetContent | IM Client → IM Server |
| ReceiveContent | IM Server → IM Client |
| GetContentInfo | IM Client → IM Server |
| DeleteContent | IM Client → IM Server |

TABLE 29

StoreContent

| Information Element | Req | Description |
|---|---|---|
| Message-Type | Mandatory | Message identifier |
| Version | Mandatory | Version of the IM specification |
| Transaction-ID | Mandatory | Identifies the store transaction |
| Own-Client-ID | Mandatory | Identifies the requesting IM client |
| Own-User-ID | Mandatory | Identifies the requesting IM user |
| Group-ID | Mandatory | Identification of the group |
| Content-Properties | Mandatory | Identifies the properties of the content, such as header, sharing, etc. |
| Content-Header | Mandatory | Header of the content |
| Content-Type | Mandatory | Type of the stored content |
| Content | Optional | Stored content |

TABLE 30

ReceiveContent

| Information Element | Req | Description |
|---|---|---|
| Message-Type | Mandatory | Message identifier |
| Version | Mandatory | Version of the IM specification |
| Transaction-ID | Mandatory | Identifies the retrieval transaction |
| Group-ID | Mandatory | Identification of the group |
| Content-ID | Mandatory | Identifies the content |
| Content-Header | Mandatory | Header of the content identifying the properties of the content. |
| Content-Type | Mandatory | Type of the stored content |
| Content | Mandatory | Stored content |

TABLE 31

ContentInfo

| Information Element | Req | Description |
|---|---|---|
| Message-Type | Mandatory | Message identifier |
| Version | Mandatory | Version of the IM specification |
| Transaction-ID | Mandatory | Identifies the store or get content info transaction |
| Content-Header-List | Mandatory | List of content headers |
| Content-Status | Optional | Status of the store or delete operation |

TABLE 32

GetContent

| Information Element | Req | Description |
|---|---|---|
| Message-Type | Mandatory | Message identifier |
| Version | Mandatory | Version of the IM specification |
| Transaction-ID | Mandatory | Identifies the retrieval transaction |
| Own-Client-ID | Mandatory | Identifies the requesting IM client |
| Own-User-ID | Mandatory | Identifies the requesting IM user |
| Content-ID | Mandatory | Identifier of the requested content |

TABLE 33

GetContentInfo

| Information Element | Req | Description |
|---|---|---|
| Message-Type | Mandatory | Message identifier |
| Version | Mandatory | Version of the IM specification |
| Transaction-ID | Mandatory | Identifies the content info transaction |
| Own-Client-ID | Mandatory | Identifies the requesting IM client |
| Own-User-ID | Mandatory | Identifies the requesting IM user |
| Group-ID | Mandatory | Identifies the user group |

TABLE 34

DeleteContent

| Information Element | Req | Description |
|---|---|---|
| Message-Type | Mandatory | Message identifier |
| Version | Mandatory | Version of the IM specification |
| Transaction-ID | Mandatory | Identifies the delete transaction |
| Own-Client-ID | Mandatory | Identifies the requesting IM client |
| Own-User-ID | Mandatory | Identifies the requesting IM user |
| Group-ID | Mandatory | Identifies the group |
| Content-ID | Mandatory | Identifies the content to be deleted |

Exception Management

1. IM Application Exception Management

In general, there are two mechanisms for the exception handling: a transaction may have its own error handling or it may rely on the general mechanism. For backward compatibility reasons, the own error handling in the transaction may always been replaced by the general error handling. This section describes the general error handling mechanism, presented in FIG. 11A.

A transaction is identified by the transaction identifier (T) in the requesting primitive ("Request") on a line 700 from a client to a server or on a line 702 from a server to a client. The IM server or client replies back with a Status message on a line 704 or 706, indicating the success or failure of the transaction as well as further clarifying information.

Even if the transaction defines its own error handling, the requesting IM client or IM server must be prepared to receive the Status message instead. In this way, the requested entity may inform that it is not capable to handle the transaction.

Figure 11B:
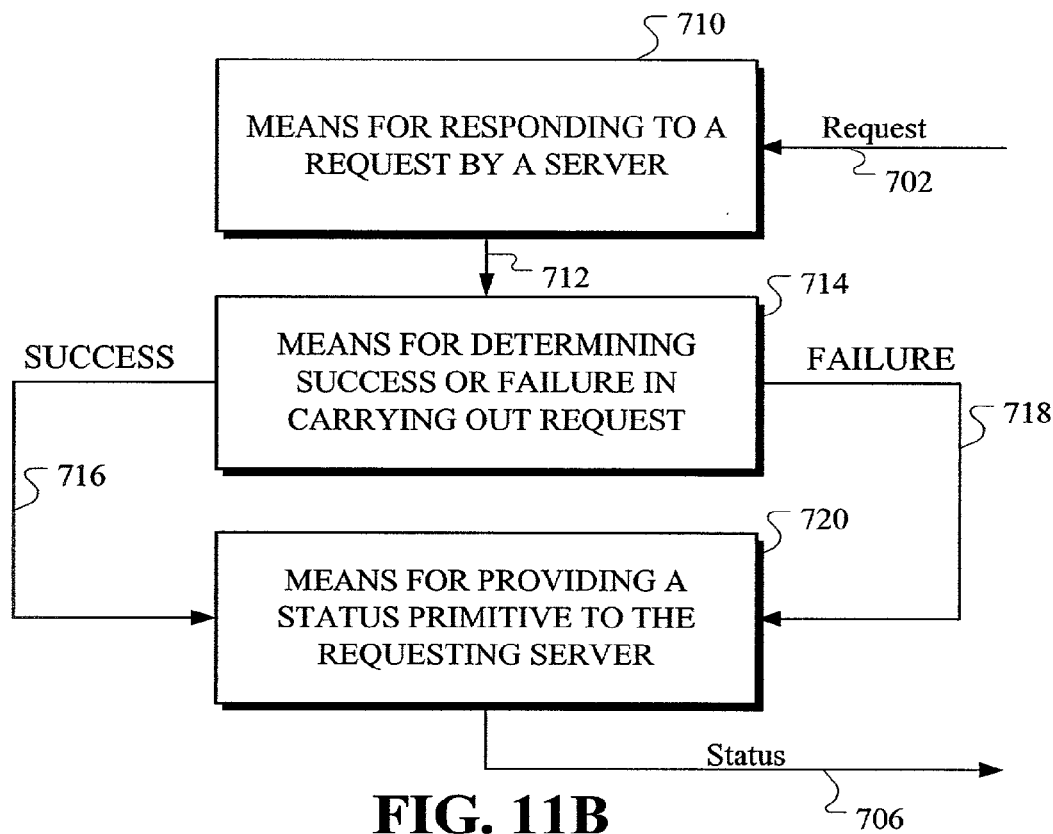
FIG. 11B shows details of an IM service capabilities layer at an IM client for carrying out exception management at the IM client, according to the present invention.

FIG. 11B shows exception handling at the IM service capabilities layer 12 of the IM client 20 of FIG. 1B. It is not particular to any subpart thereof since the status message is generally used throughout the IM service capabilities layer as shown in the various message flow diagrams in detail above. In response to an incoming primitive ("Request") on the line 702, a means 710 for responding such a request by a server provides information elements corresponding thereto on a line 712 to means 714 for determining success or failure in carrying out the request. Success is indicated by a signal on a line 716 while failure is indicated on a line 718 to a means 720 for providing the status primitive on the line 706. This primitive has information elements such as shown in Table 36 and includes status codes such as shown in Table 37.

Figure 11C:
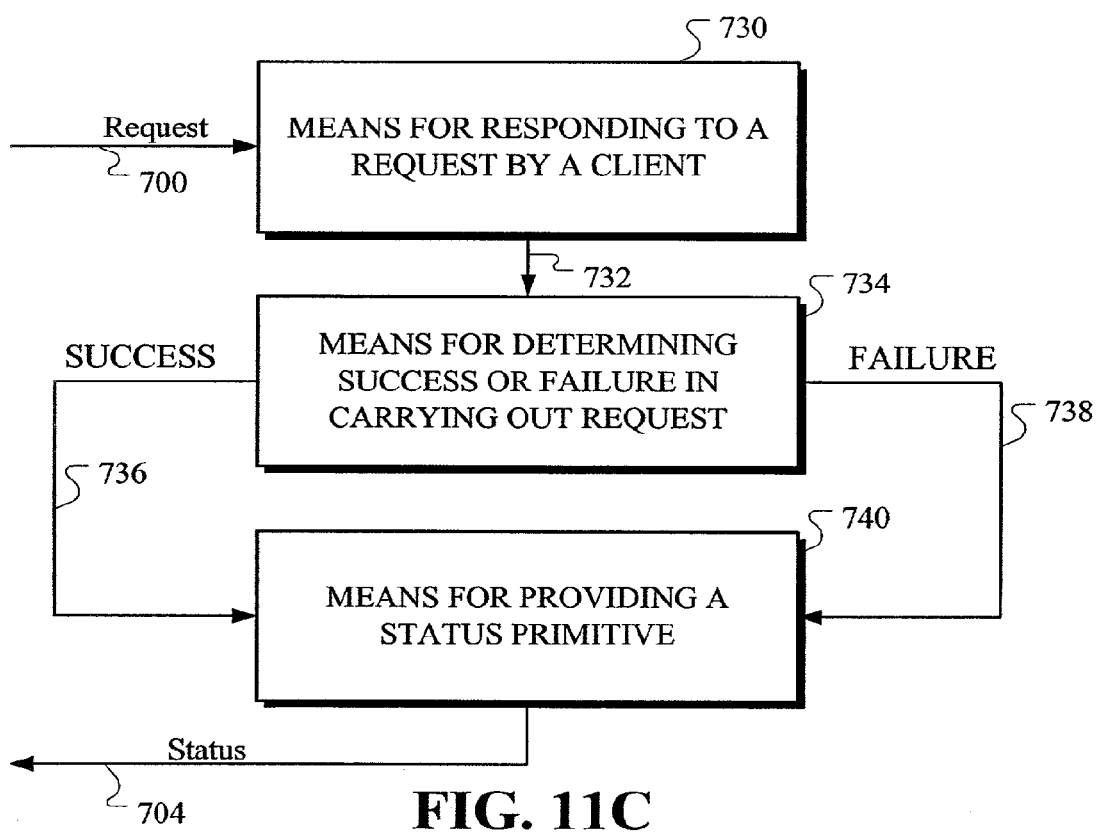
FIG. 11C shows details of a subscriber/interconnection management layer at an IM server for carrying out exception management at the IM server, according to the present invention.

Likewise, on the server side as shown in FIG. 11C, a request such as that provided on the line 700 from an IM client is provided to means 730 for responding to such a request by a client at the server with a signal on a line 732. A means 734 determines success or failure in carrying out the request and indicates success on a line 736 or failure on a line 738 to means 740 for providing the status primitive on the line 704 having a structure of information elements such as shown in Table 35 with an explanation of status codes such as shown in Table 37.

2. Primitives and Information Elements

TABLE 35

Messages in general error handling.

| Primitive | Direction |
|---|---|
| Status | IM Client → IM Server |
| Status | IM Server → IM Client |

TABLE 36

Status

| Information Element | Req | Description |
|---|---|---|
| Message-Type | Mandatory | Message identifier |
| Version | Mandatory | Version of the IM specification |
| Transaction-ID | Mandatory | Identifies the transaction requested |
| Status | Mandatory | Status value |
| Message-ID | Conditional | Identifies the message to be delivered, if message delivery transaction. |
| Group-ID | Conditional | Identifies the user group, if user group is involved in transaction |
| Join-ID | Conditional | Dynamic identification of the join session. Present if join was successful. |

TABLE 37

Explanation of status codes

| Class | Code | Description |
|---|---|---|
| None | Ok | Message identifier |
| Service Provisioning | No subscription | |
| | No credit | |
| Message Content | Invalid field | |
| Network | Request not supported | |
| Authorisation | Some presence values denied | |
| | All presence values denied | |

DEFINITIONS FOR INFORMATION ELEMENTS

| Information element | Definition |
|---|---|
| All-Users-List | The user list containts a list or zero or more IM user identifications. For further info, see Own-User-ID. |
| Authorise-Status | The authorise status contains enumerated values indicating the status of the authorisation request. The values are: not supported, successful, failure |

| Information element | Definition |
| --- | --- |
| Content | The content may be any MIME content, such as text/plain. |
| Content-Header | The content header consists of the following information: owner User-ID of the content, Content-Type, textual header describing the content, size of the content and sharing information. |
| Content-Header-List | A list of content headers within an IM user group. For further info, see Content-Header. |
| Content-ID | Content-ID is a textual identification of the content, based on RFC2557 format. |
| Content-Status | The status of the content storage or delete request. Values are: not supported, successful, failure. |
| Content-Type | The MIME type of the stored content |
| Delete-Users-List | A list of IM users to be deleted. For further info, see Own-User-ID. |
| Delivery-Status | Indicates the delivery status of the message: delivered, expired, rejected, failure, etc. |
| Group-ID | The identification of the IM user group. The identification is based on either E.164 numbering plan or to email address. |
| Group-Properties | The properties of the group: buddy list, private or public, owner of the group, open or closed user group, features available such as content storage, maximum number of IM users. |
| Inv-User-List | A list of IM users to be invited to a chat session via private user group. |
| Join-Acceptance | A status value whether user accepts joining to the user group or not |
| Join-ID | The dynamic identification of the join session to private or public user group. |
| Joined-User-List | A list of joined users. For further info, see Own-User-ID. |
| Join-Properties | The properties of the user joining the group: status in the group (active, silent, etc), blocked IM users, the possible nickname to be used in the group, etc. |
| Left-Reason | The reason to leave from the user group: requested by user, kicked-off, etc. |
| Left-User-List | A list of left users. For further info, see Own-User-ID. |
| Message-Type | The type of the message identifying the version. |
| New-Users-List | A list of new IM users. For further info, see Own-User-ID. |
| Own-Client-ID | The own client ID identifies the IM client requesting an operation. |
| Own-User-ID | The own user ID identifies the IM user requesting an operation. The ID is expressed either by mobile number (E.164 numbering plan) or by email address (RFC-822). In addition, when the IM user is involved in a group, the own user ID can be a nickname which refers to the stored address in the group [m1]. |
| Presence-Value-List | A list of presence values, as described in the presence section above. |
| Reject-Reason | A textual explanation why invitation to chat was rejected. |
| Req-User-ID | The requested user ID identifies the IM user which is a destination of a requested operation. The ID is expressed either by mobile number (E.164 numbering plan) or by email address (RFC-822). In addition, when the IM user is involved in a group, the requested user ID can be a nickname which refers to the stored address in the group. |
| Search-User-List | A list of IM user IDs which are to be searched. For further info, see Own-User-ID. |
| Status | Status values in general transactions. The values are divided into several classes and subcodes there Status: transaction successful, transaction failure Class: None, Service provisioning, Message Content, Network related, Authorisation Additional information to be presented to the end user. |
| Version | The version of the IM specification, expressed in <major>.<minor> version style. |

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

The invention claimed is:

1. A method comprising:
assembling, in a terminal device configured to communicate over a network, a primitive having information elements with a structure recognizable by the terminal device and at least one other entity configured to communicate over the network, the assembling including combining at least (i) a client identifying information element identifying an instant messaging (IM) client and (ii) a user of the IM client; and
communicating the primitive from the terminal device to the network,
wherein the IM client is installed in the terminal device, and implements an instant messaging service using the primitive,
wherein the user of the IM client is a subscriber to the instant messaging service,
wherein the information elements of the user of the IM client includes a user name and a password,
wherein the information elements of the client identifying information element identifying the IM client includes an IM client name and an IM client address,
wherein the IM client name is a name of the IM client that is used to send and receive messages to the user of the IM client accessing via the IM client and to record information based on the IM client, and
wherein, when the user of the IM client first accesses the instant messaging service, the IM client determines to send to an IM server a null logon message that includes neither the password of the user nor identity of the IM client, and determines to send with the null logon a message indicating a schema implemented in the IM client.

2. A method of claim 1, wherein the primitive is an update presence primitive for use in communicating presence information to the network.

3. A method of claim 1, wherein the primitive is an unsubscribe presence primitive for communicating a request to the network to discontinue receipt of selected presence information.

4. A method of claim 1, wherein the primitive is a leave group primitive for communicating a request to discontinue participation in a group to the network.

5. A method of claim 1, wherein the primitive is a create group primitive for communicating a request to create a group to the network.

6. A method of claim 1, wherein the primitive is a delete group primitive for communicating a request to delete a group to the network.

7. A method of claim 1, wherein the primitive is a get group information primitive for communicating a request for group information to the network.

8. A method of claim 1, wherein the at least one other entity is configured to use the client identifying information element and the user of the IM client of the communicated primitive to distinguish the IM client and the user of the IM client.

9. A system comprising:
a terminal device configured to communicate over a network, the terminal device further configured to assemble a primitive having information elements with a structure recognizable by the terminal device, and further configured to communicate the primitive over the network; and
at least one other entity configured to communicate over the network, the at least one other entity further configured to receive the primitive,
wherein the primitive includes at least a client identifying information element identifying an instant messaging (IM) client and a user of the IM client,
wherein the IM client is installed in the terminal device, and implements an instant messaging service using the primitive,
wherein the user of the IM client is a subscriber to the instant messaging service,
wherein the information elements of the user of the IM client includes a user name and a password,
wherein the information elements of the client identifying information element identifying the IM client includes an IM client name and an IM client address,
wherein the IM client name is a name of the IM client that is used to send and receive messages to the user of the IM client accessing via the IM client and to record information based on the IM client, and
wherein, when the user of the IM client first accesses the instant messaging service, the IM client determines to send to an IM server a null logon message that includes neither the password of the user nor identity of the IM client, and determines to send with the null logon a message indicating a schema implemented in the IM client.

10. A system of claim 9, wherein said primitive is an update presence primitive for use in communicating presence information to said network.

11. A system of claim 9, wherein said primitive is an unsubscribe presence primitive for communicating a request to said network to discontinue receipt of selected presence information.

12. A system of claim 9, wherein said primitive is a leave group primitive for communicating a request to discontinue participation in a group to said network.

13. A system of claim 9, wherein said primitive is a create group primitive for communicating a request to create a group to said network.

14. A system of claim 9, wherein said primitive is a delete group primitive for communicating a request to delete a group to said network.

15. A system of claim 9, wherein said primitive is a get group information primitive for communicating a request for group information to said network.

16. A system of claim 9, wherein the at least one other entity is configured to use the client identifying information element and the IM user of the received primitive to distinguish the IM client and the user of the IM client.

17. A non-transitory computer-readable storage medium carrying one or more sequences of one or more instructions which, when executed by one or more processors, cause a system to at least perform the following steps:
assembling a primitive having information elements with a structure recognizable by a terminal device configured to communicate over a network; and
communicating the primitive from the terminal device to the network,
wherein the primitive includes at least a client identifying information element identifying an instant messaging (IM) client and a user of the IM client,
wherein the IM client is installed in the terminal device, and implements an instant messaging service using the primitive,
wherein the user of the IM client is a subscriber to the instant messaging service,
wherein the information elements of the user of the IM client includes a user name and a password,
wherein the information elements of the client identifying information element identifying the IM client includes an IM client name and an IM client address,
wherein the IM client name is a name of the IM client that is used to send and receive messages to the user of the IM client accessing via the IM client and to record information based on the IM client, and
wherein, when the user of the IM client first accesses the instant messaging service, the IM client determines to send to an IM server a null logon message that includes neither the password of the user nor identity of the IM client, and determines to send with the null logon a message indicating a schema implemented in the IM client.

18. A non-transitory computer-readable storage medium according to claim 17, wherein the primitive is an update presence primitive for use in communicating presence information to the network.

19. A non-transitory computer-readable storage medium according to claim 17, wherein the primitive is an unsubscribe presence primitive for communicating a request to the network to discontinue receipt of selected presence information.

20. A non-transitory computer-readable storage medium according to claim 17, wherein the system is caused, at least in part, to further perform:
  distinguishing the IM client and the user of the IM client using the client identifying information element and the user of the IM client included in the received primitive.

* * * * *